United States Patent [19]
Kish et al.

[11] Patent Number: 4,868,738
[45] Date of Patent: Sep. 19, 1989

[54] OPERATING SYSTEM INDEPENDENT VIRTUAL MEMORY COMPUTER SYSTEM

[75] Inventors: John W. Kish, Roswell; John S. Alcorn, Symrna; David B. Burleson, Snellville, all of Ga.

[73] Assignee: Lanier Business Products, Inc., Atlanta, Ga.

[21] Appl. No.: 766,024

[22] Filed: Aug. 15, 1985

[51] Int. Cl.⁴ .................. G06F 12/10; G06F 15/16
[52] U.S. Cl. ............................ 364/200; 364/228; 364/228.1; 364/246.1; 364/256.3
[58] Field of Search ... 364/200 MS File, 900 MS File

[56] References Cited

U.S. PATENT DOCUMENTS

| | | | |
|---|---|---|---|
| 3,275,991 | 12/1962 | Schneberger | 364/200 |
| 3,412,382 | 11/1965 | Couleur et al. | 364/200 |
| 3,693,165 | 9/1972 | Reiley et al. | 364/200 |
| 3,854,126 | 12/1974 | Gray et al. | 364/200 |
| 3,902,164 | 8/1975 | Kelley et al. | 364/200 |
| 3,938,100 | 2/1976 | Steiner | 364/200 |
| 3,990,051 | 11/1976 | Shelly | 364/200 |
| 4,037,209 | 7/1977 | Nakajima et al. | 364/200 |
| 4,121,286 | 10/1978 | Venton et al. | 364/200 |
| 4,145,739 | 3/1979 | Dunning et al. | 364/200 |
| 4,282,572 | 8/1981 | Moore, III, et al. | 364/200 |
| 4,493,021 | 1/1985 | Agrawal et al. | 364/200 |
| 4,516,199 | 5/1985 | Frieder et al. | 364/200 |
| 4,591,982 | 5/1986 | Buonomo et al. | 364/200 |
| 4,597,084 | 6/1986 | Dynneson et al. | 364/200 X |
| 4,608,631 | 8/1986 | Stiffler et al. | 364/200 |
| 4,669,043 | 5/1987 | Kaplinsky | 364/200 |
| 4,698,753 | 10/1987 | Hubbins et al. | 364/200 |

OTHER PUBLICATIONS

Denning, 1970, "Virtual Memory", *Comp. Surv.* 2,3:153-189, reprinted from Freeman, *Software Systems Principles, A Survey*, 1975, pp. 204-257.

Furht, et al., Borivoje, "A Survey of Microprocessor Architectures for Memory Management", *Computer*, pp. 48-67, Mar. 1987.

3D.Ready Implementation and Timing, Intel Corporation Microsystem Components Handbook, Microprocessors and Peripherals, vol. I(1985), pp. 3—30-5-3—307.

Primary Examiner—Raulfe B. Zache
Assistant Examiner—Florin Munteanu
Attorney, Agent, or Firm—Jones, Askew & Lunsford

[57] ABSTRACT

An improved virtual memory computer system comprising a main processing unit for executing application and operating system software without virtual memory code and independently of virtual memory operation. A dedicated second processing unit is provided for maintaining a memory map, which translates addresses in the main processing unit address space into physical memory addressess of a primary memory. A network interface allows pages or segments of data from a secondary memory connected to a communications network to be transferred into the primary memory in a manner transparent to the operation of the main processing unit. A direct memory access (DMA) circuit transfer the header portion of a network-transferred page of data into a separate auxiliary addressable memory for storage of network overhead information, while the useful data portions of the page are stored directly in locations in the primary addressable memory. A requested page of data is then placed directly in a desired location in primary memory without the need for moving or re-transferring the data within the primary memory to strip off network header information after a DMA transfer. The system is responsive to detect and correct a page fault condition prior to execution of the main processing unit instruction which generated the page fault, which obviates reexecution of instructions or correction of instruction execution results by the main processing unit.

44 Claims, 13 Drawing Sheets

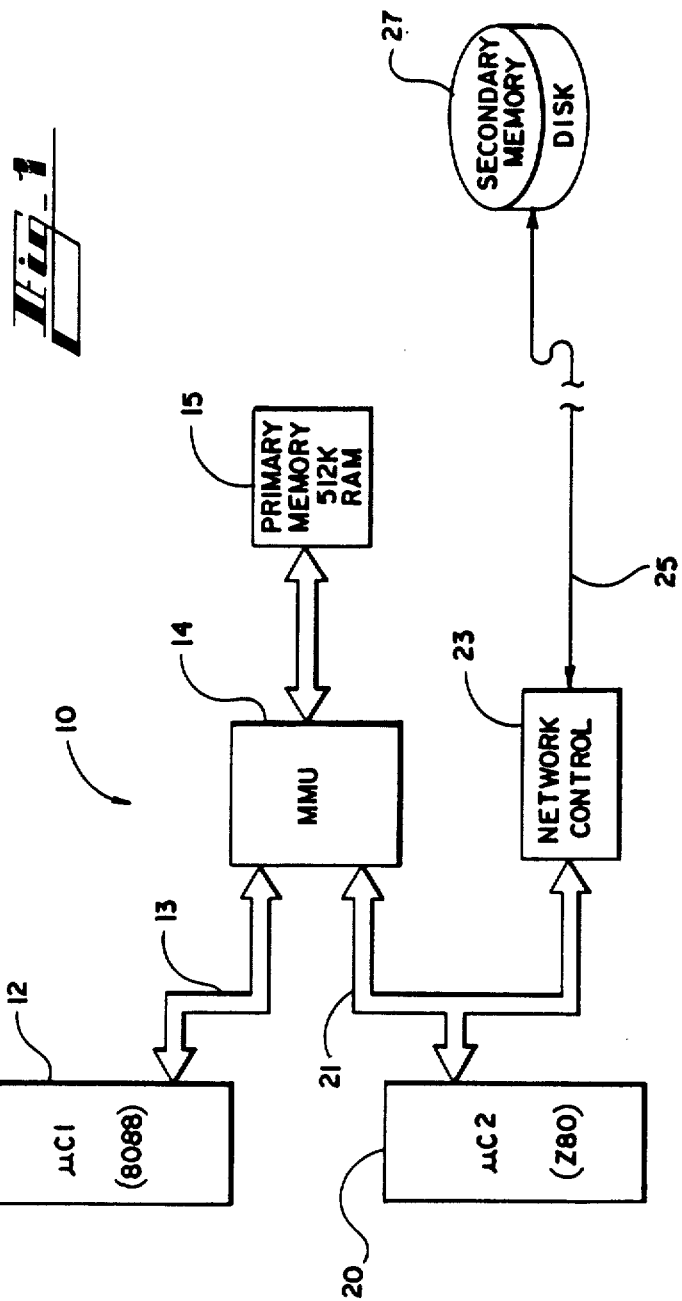

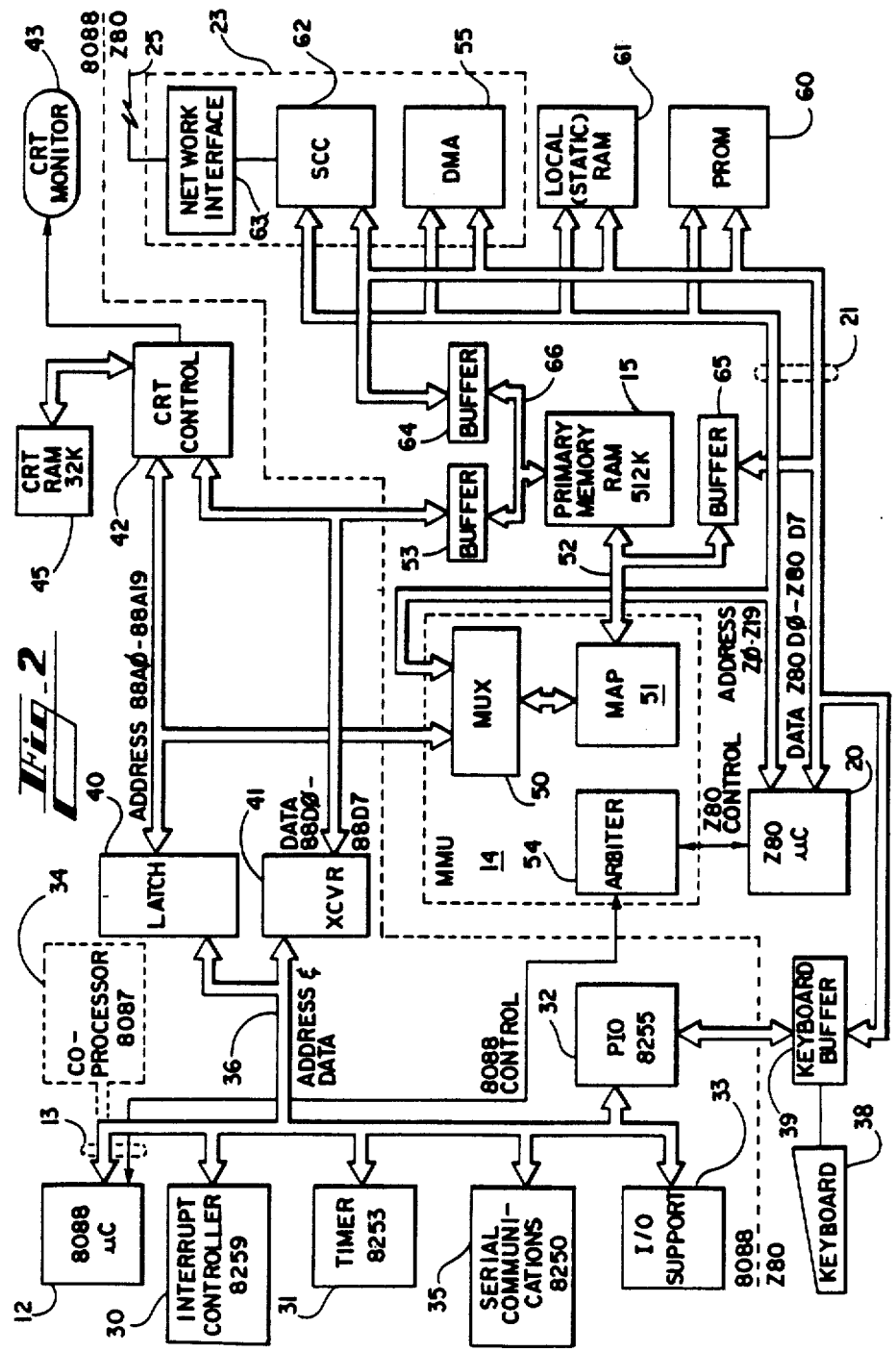

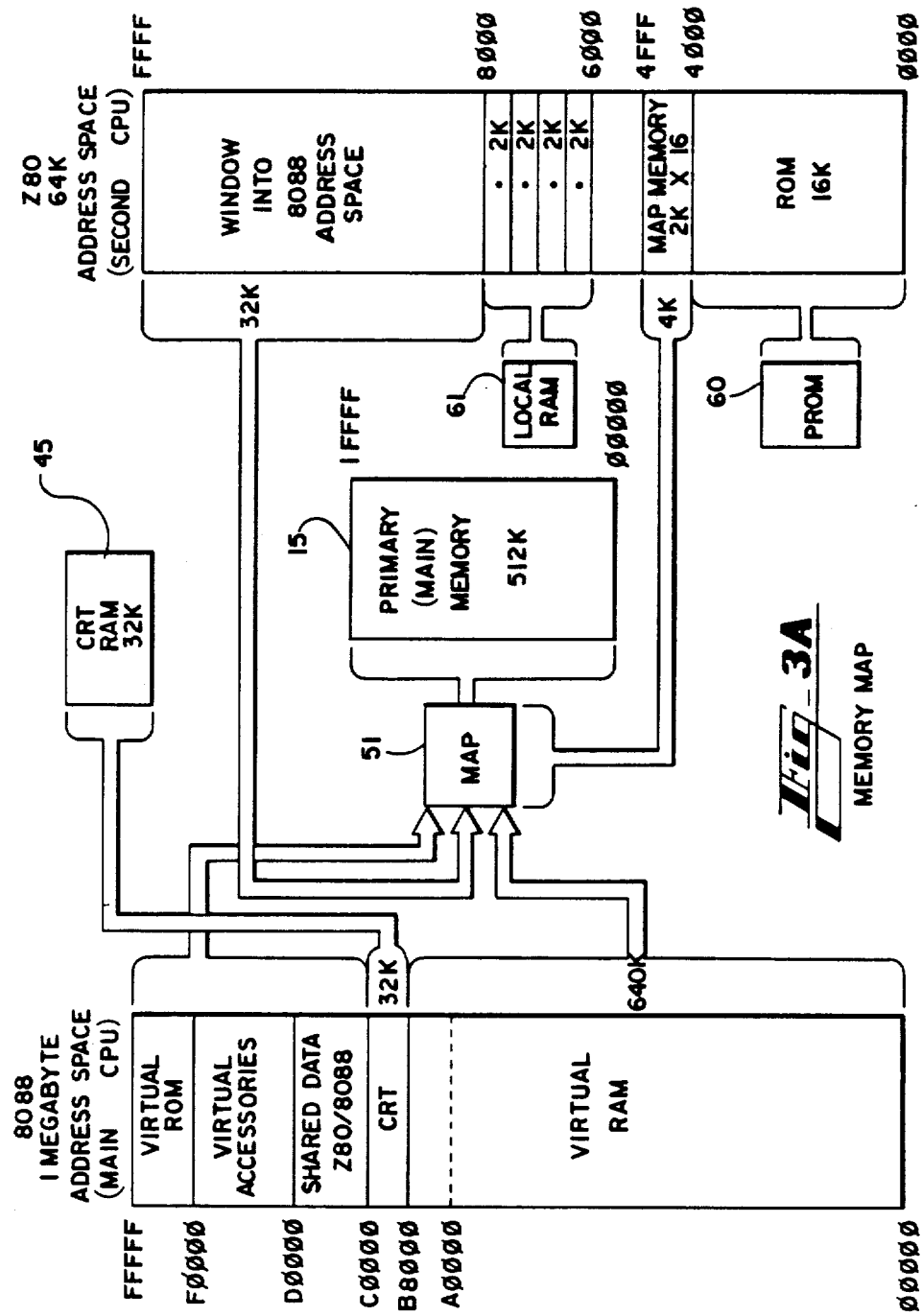
Fig. 3A MEMORY MAP

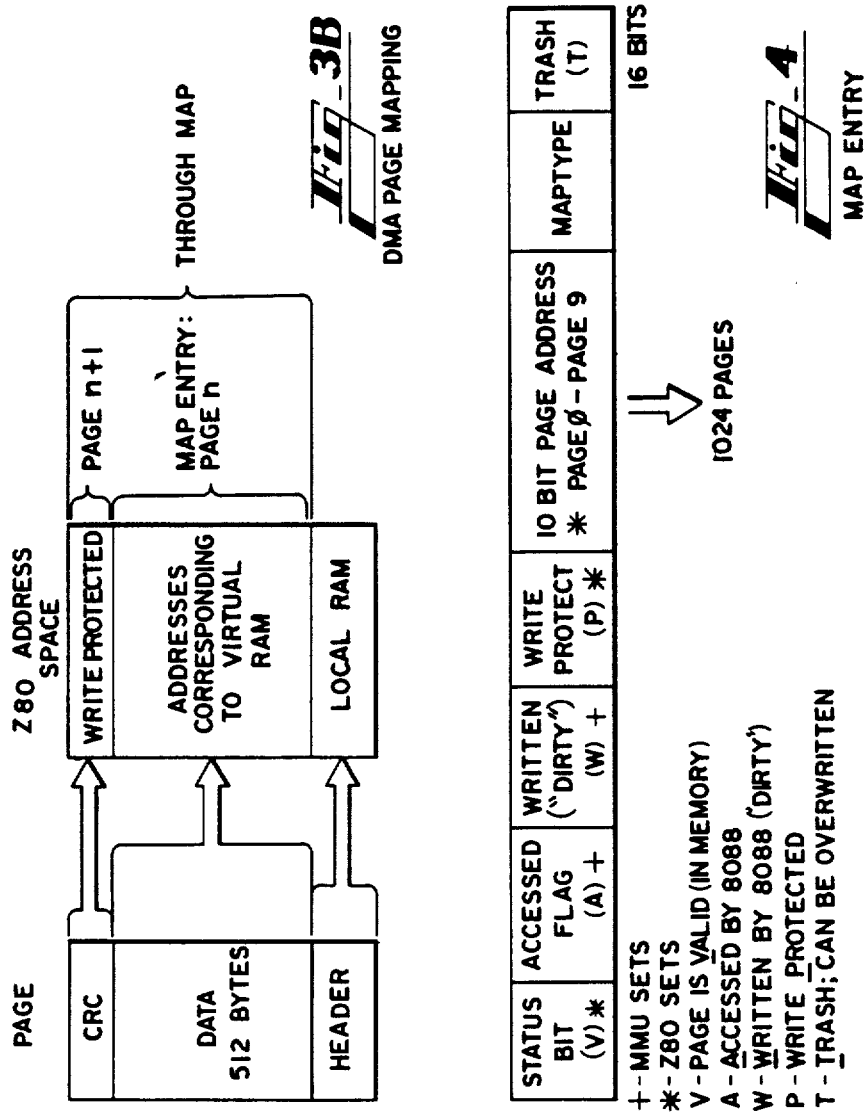

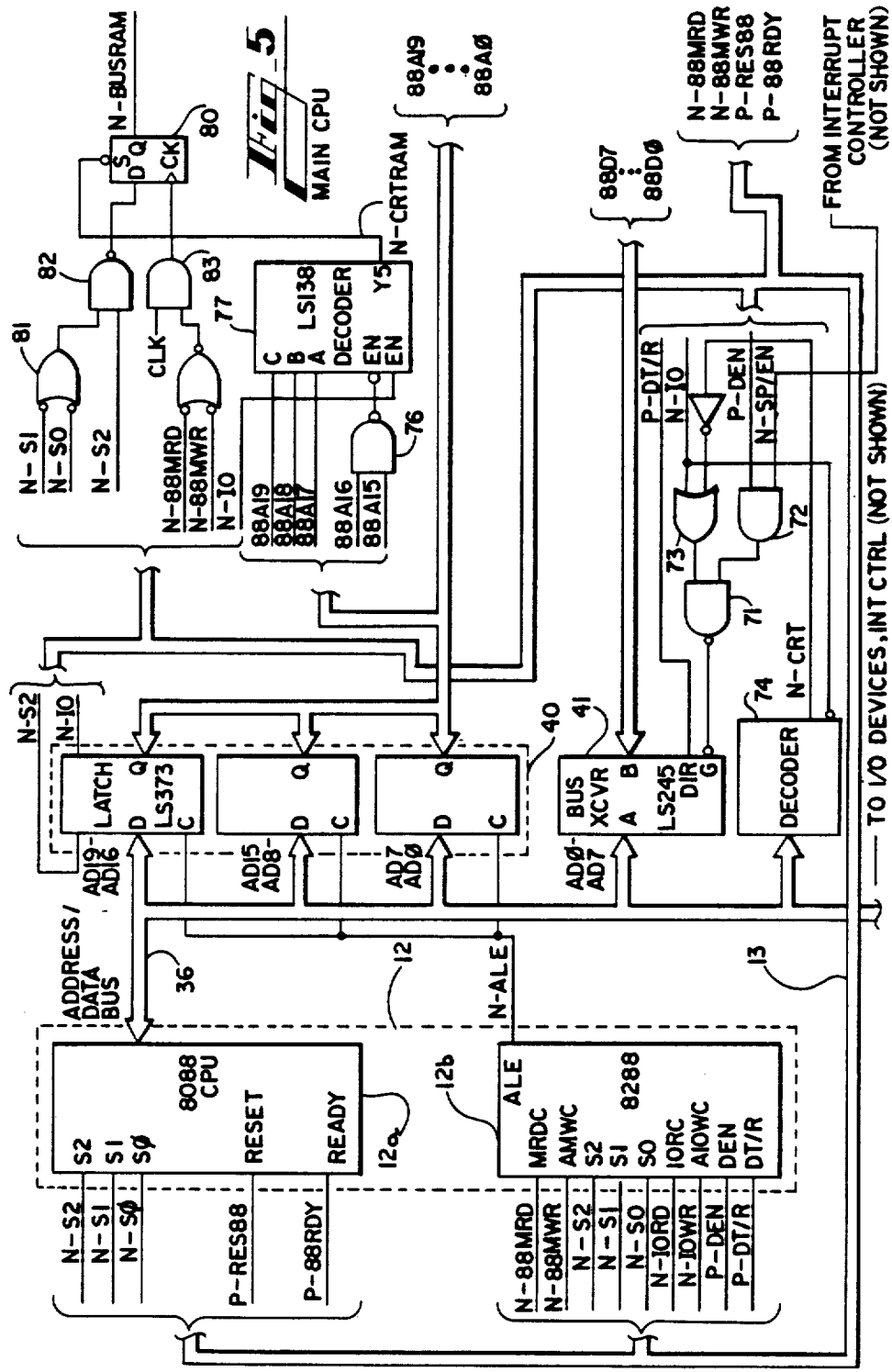

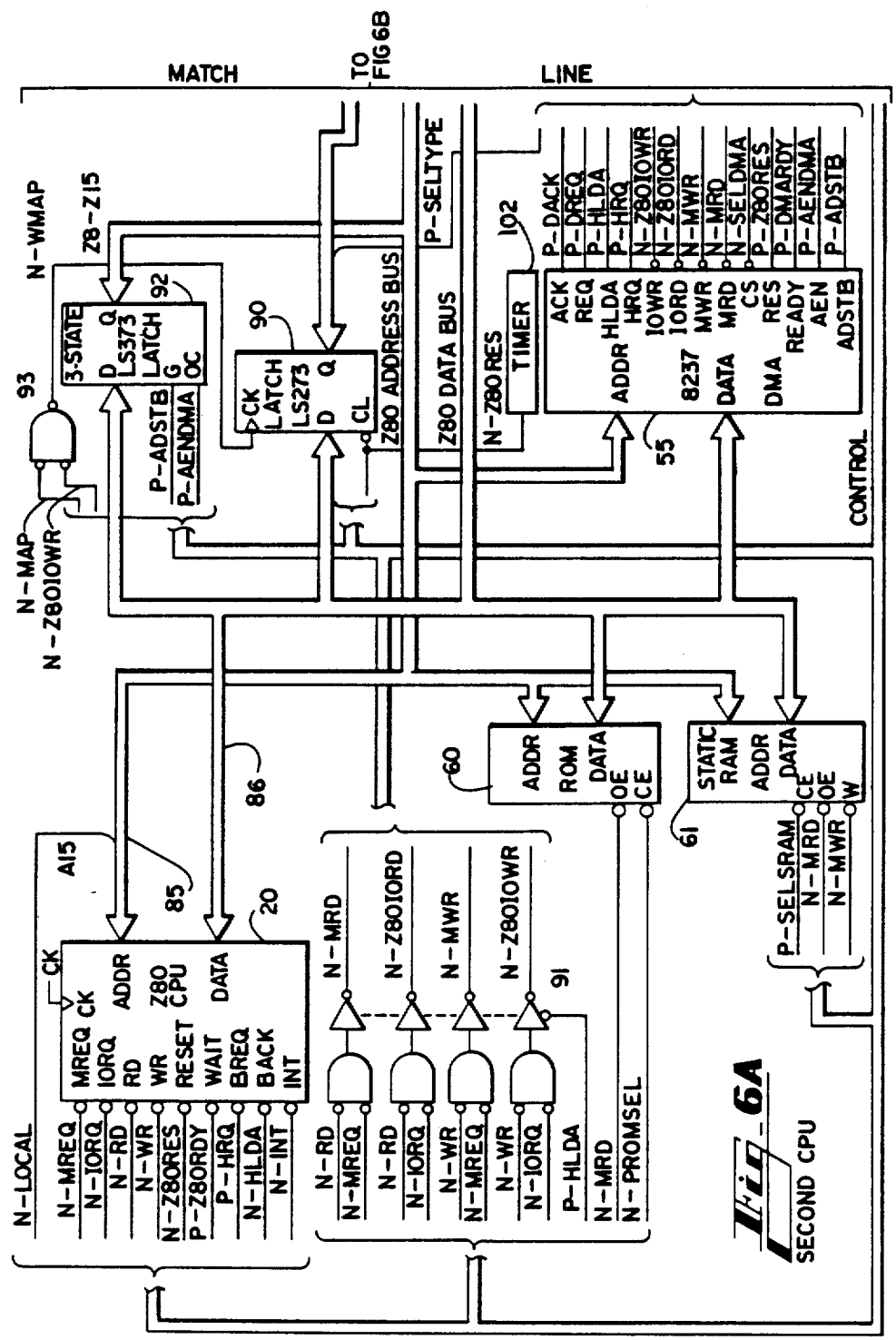
Fig_6A

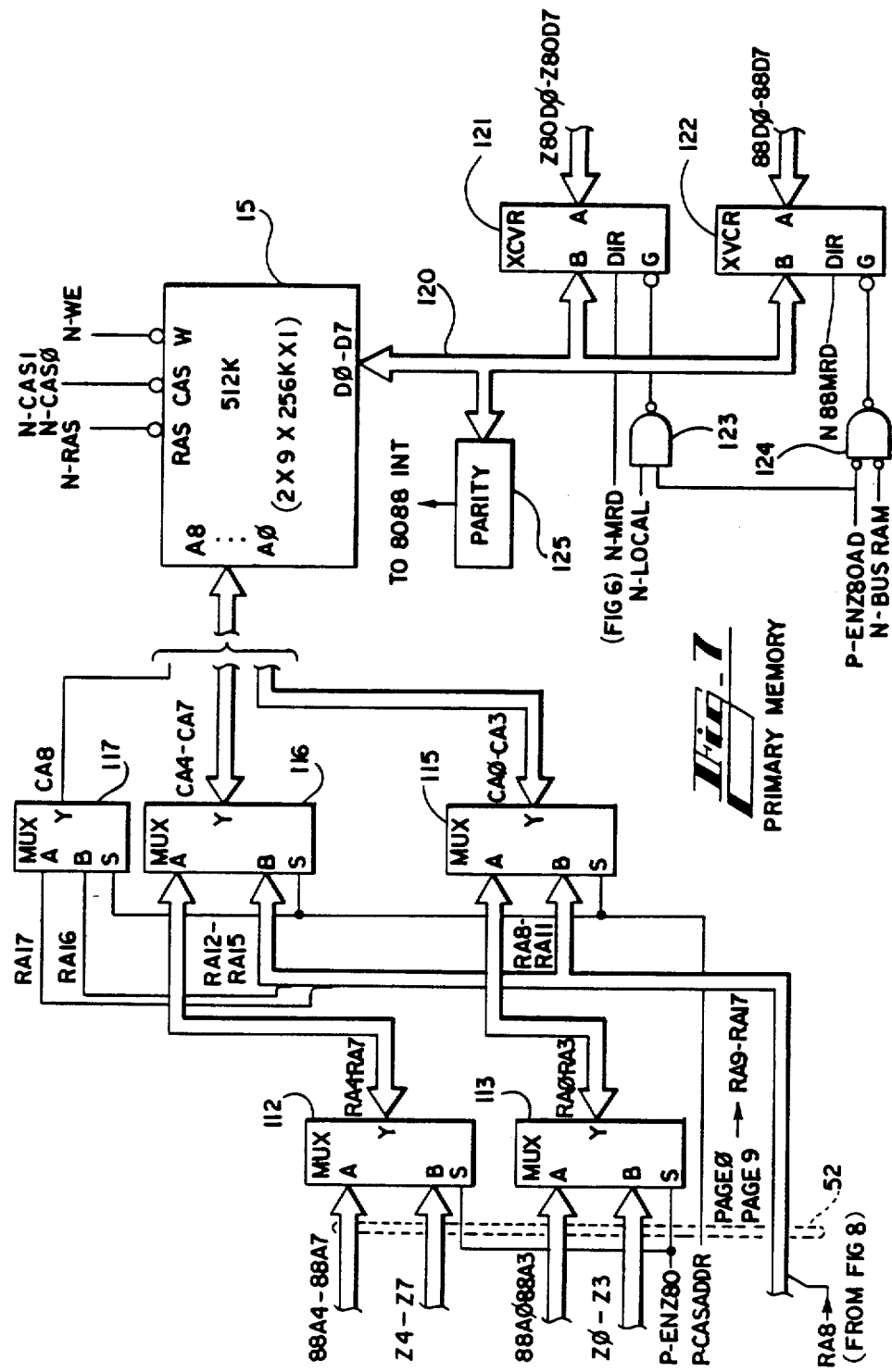
Fig-7 PRIMARY MEMORY

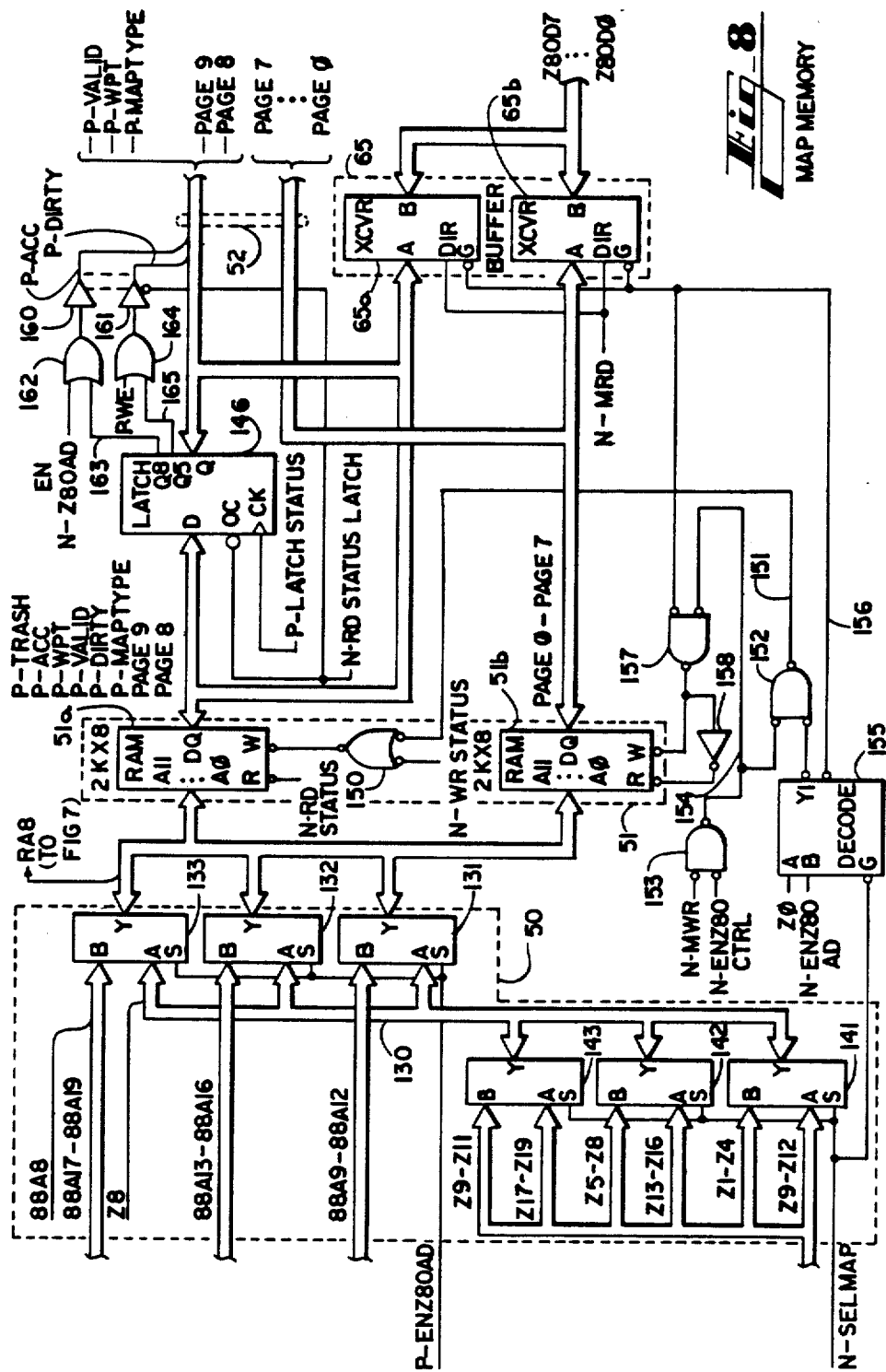

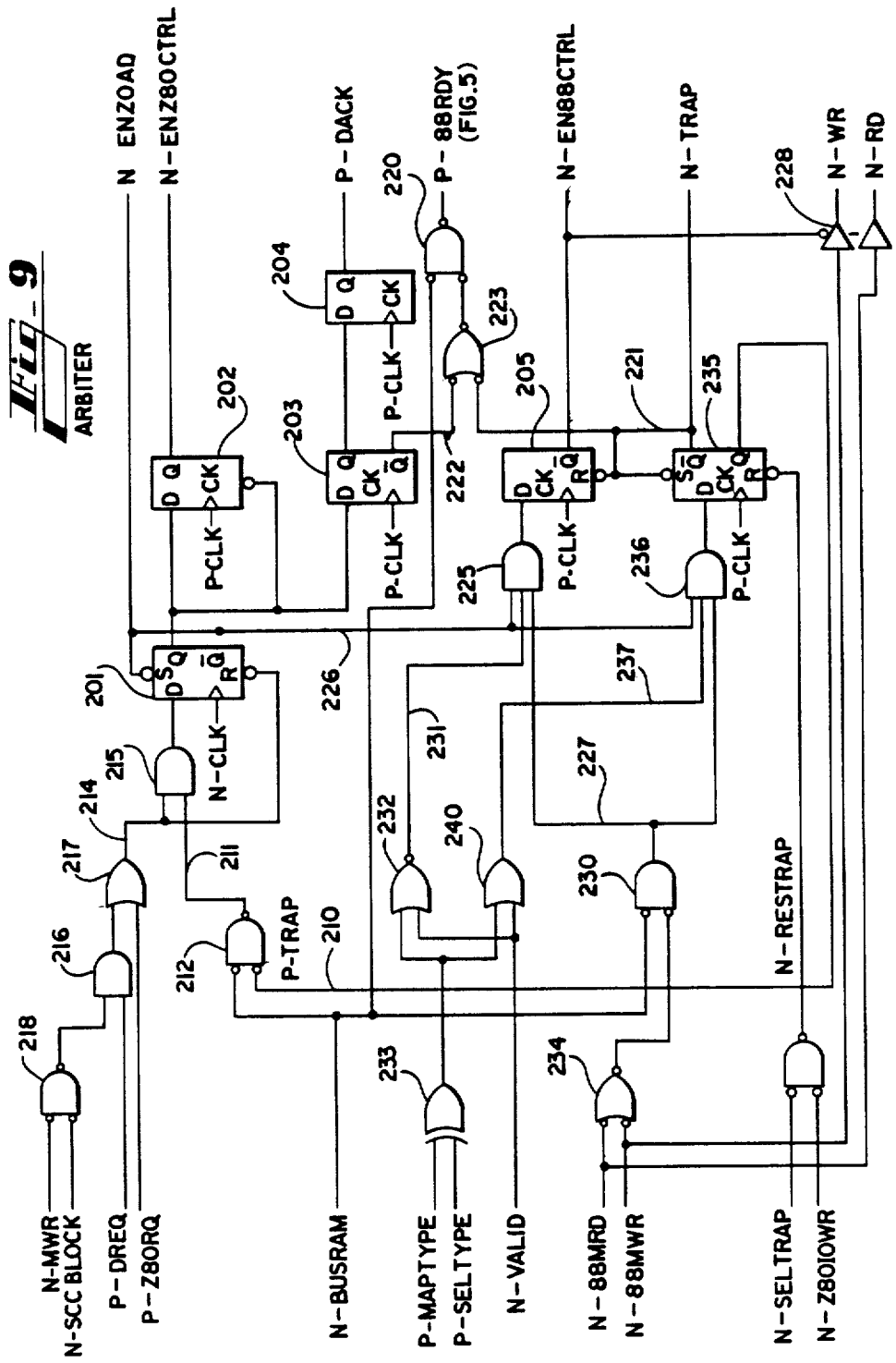
Fig_9 ARBITER

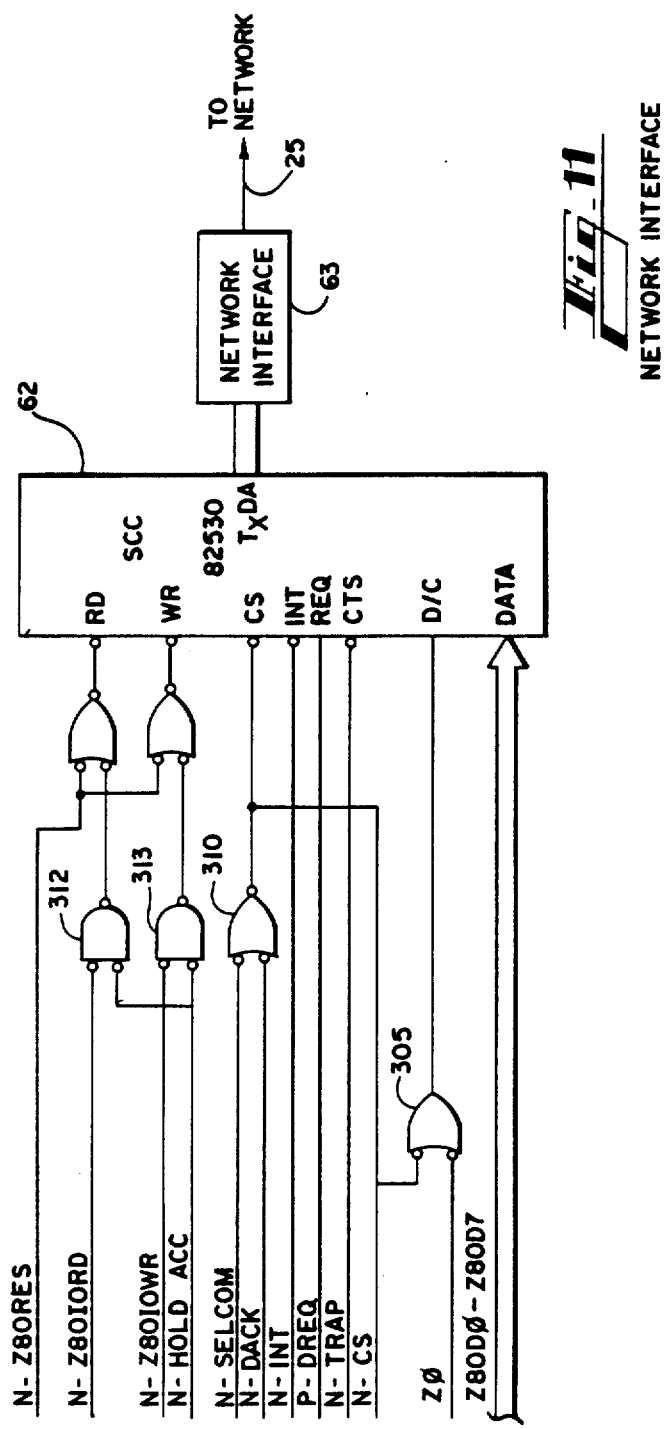
Fig. 11 NETWORK INTERFACE

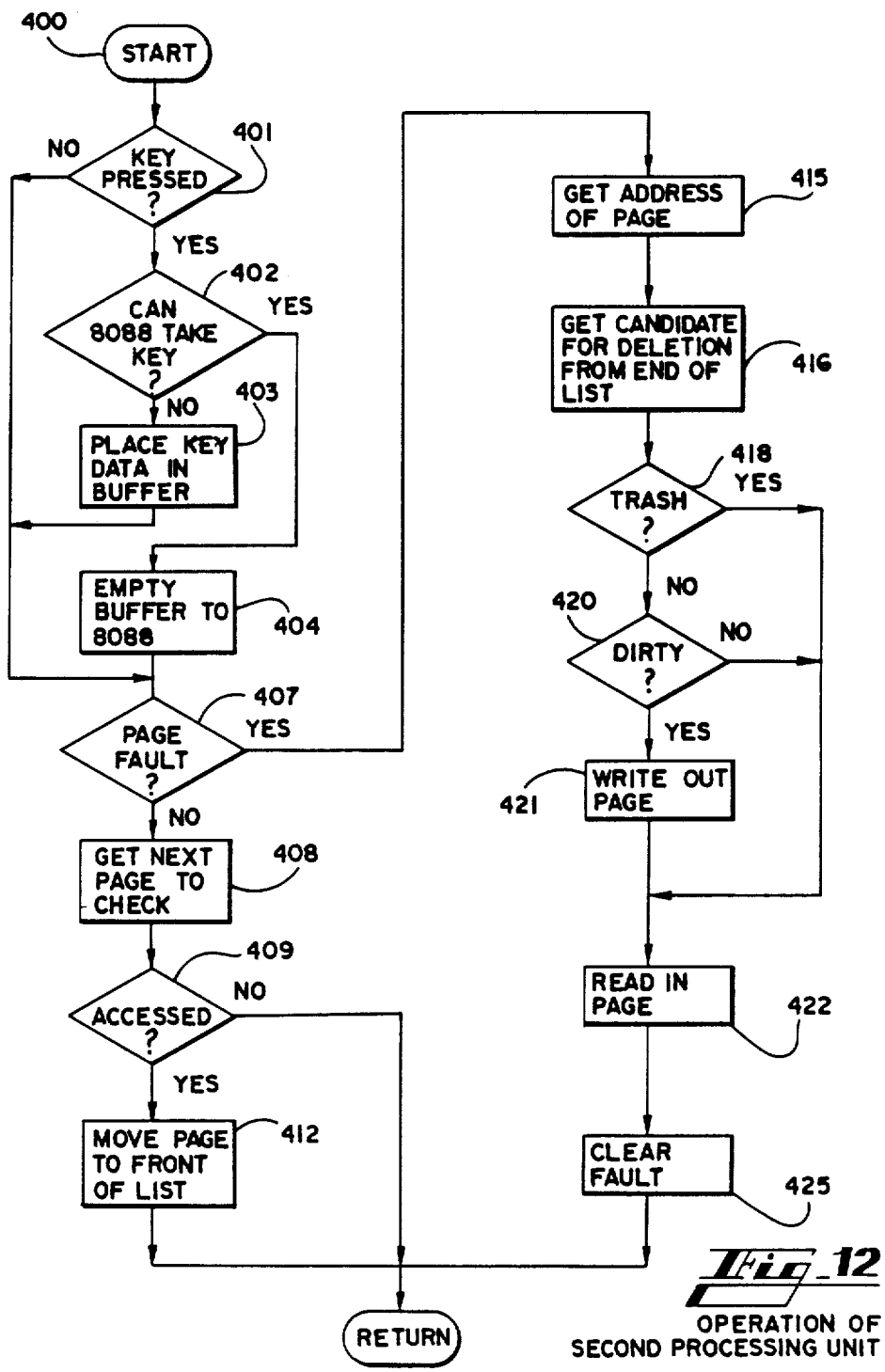

OPERATING SYSTEM INDEPENDENT VIRTUAL MEMORY COMPUTER SYSTEM

TECHNICAL FIELD

The present invention relates generally to computer systems, and more particularly relates to an improved virtual memory system for handling pages or segments of the data transferred via a communications network, wherein header portions of the transferred data are stored in a memory area separate from data portions, to obviate relocation of the data portions.

BACKGROUND OF THE INVENTION

In the early days of computers, memories were expensive and small. Early programmers spent large amounts of time trying to squeeze programs into tiny memory, and often were forced to divide programs into pieces called "overlays" each of which could fit in memory at one time. As software technologies improved, a technique known as "virtual memory" was developed, wherein the concepts of address space and actual physical memory locations were separated. As known to those skilled in the art, the number of addressable words accessible by a computer depends on the number of bits in the address field and is in no way related to the number of memory words actually available. For example, a hypothetical computer having a sixteen-bit address field can theoretically address 65,536 (64K) words of memory. However, if only 4096 (4K) words of main memory are provided, the addressing capability of the computer is not being fully exploited. As used herein, the term "address space" represents the number of words a particular computer can address utilizing all bits of the address field provided in the computer architecture. In the hypothetical computer referenced above, the address space comprises the numbers 0, 1, 2, ... 65,535, the set of possible addresses.

In a classical virtual memory, there is provided a fixed number of actual, physical words of memory. The address space of the computer is "mapped" onto the physical memory, by translating addresses in the address space into physical memory locations. For example, in the hypothetical machine referenced above having 4K words of memory, a "map" may be created for containing information which relates addresses generated in the 64K address space of the computer to addresses in the 4K main memory. For purposes of the present application, the addresses that a computer program can refer to, a function of the computer architecture, shall be referred to as the "virtual address space" and the actual, hard-wired memory addresses are defined as the "physical address space". A "memory map" relates virtual addresses to physical addresses. Accordingly, it will be understood that programs may load from, or store into, any word in the virtual address space, or jump to any instruction within the virtual address space, without regard to whether there is any actual data at those virtual addresses.

Most conventional virtual memory systems determine when a portion of memory (known typically as a "page" or "segment") not physically present in the main memory has been addressed by the computer, locate the desired information in a secondary memory such as a bulk storage device, load the information from the secondary memory into the main memory, and modify the memory map to reflect that the virtual address provided by the computer now relates to a specific particular physical address in the main memory which contains the located and now-loaded desired information. In this regard, reference is made to the classical article on virtual memory, Denning, "Virtual Memory", Computing Surveys, Vol. 2, pp 153-189 (September, 1970), reproduced in Freeman, "Software Systems Principles—A Survey", Science Research Associates, Inc., pp. 204-257 (1975), which is incorporated herein by reference and made a part hereof, and will not be discussed further herein.

One problem frequently encountered in conventional virtual memory systems is the need to relocate information retrieved from a secondary memory source such as a disk drive or the like, prior to making the information available for accessing through the memory map. For example, most conventional virtual memory systems employ a disk drive or other mass storage media as a secondary memory for storing programs and data which are not presently being accessed by the operating program. When the virtual memory system determines that a segment or page of information from the secondary memory is required, the computer operating system or special purpose hardware commands the disk drive to deliver the desired information. The data transferred from the secondary memory may be loaded by a direct memory access (DMA) mechanism, or may be loaded on demand under control of the central processing unit (CPU).

Recently, there has been a trend toward providing distributed computing and data storage capabilities, so that a plurality of satellite processors can share a remotely-located disk drive or other peripheral resource via a communications network. For example, many personal computer networks are designed to include a disk drive as secondary memory which can simultaneously serve a plurality of central processing units. The various satellite or remote CPU's share access to the disk drive on a time-sharing basis when programs or data are to be loaded. A "network server" allocates use of the system resources between processors connected to the network. In order to serve a plurality of CPU's, it is necessary for the network server to maintain records as to the source and usage of blocks of data, so that if modifications or updates have been made to a block of data, the server can find the original stored block for updating.

Blocks of data transferred via a communications network are frequently referred to as "pages", "segments", "packets", and the like. These terms are also frequently used in connection with virtual memory systems. In many communication networks, a page or other transferred block comprises a header, a data portion, and a trailer. Typically, information such as the address of a page or segment of data in a secondary memory are stored in the header portion, which precedes the actual useful data. The trailer which follows the data usually is present for determining data accuracy through cyclic redundancy checking (CRC) or other data integrity scheme.

In some computer systems, a portion of memory is reserved for receiving DMA transfers of blocks of data from peripherals, including network transfers. Once a page of information has been loaded by the DMA to this reserved area, it may be necessary to retransfer the desired information without the associated header and trailer to another portion of memory which has been mapped for use in connection with implementing virtual memory. This necessitates a separate data transfer from the reserved memory area to the mapped virtual memory area. It will accordingly be understood that additional processor and/or system resources must be devoted to retransferring the information from the reserved DMA transfer or "holding" area to the virtual memory area. Needless to say, such usage of system resources to first transfer a desired page into a DMA holding area, and then to retransfer only the desired portion of a retrieved page to the virtual memory area, with header and trailer portions stripped, is time consuming and wasteful. Accordingly, there is a need for a virtual memory system for operation with communication network systems, which does not require the relocation of the desired information once a DMA transfer has been made. Prior to the present invention, it has not been possible to construct a virtual memory system, even employing DMA techniques, without requiring transfers of data from a DMA holding area to a virtual memory mapped area.

Other problems exist in virtual memory systems management. In many prior art virtual memory systems, means are provided for detecting the occurrence of a "page fault" condition. A "page fault" condition occurs when a virtual memory CPU attempts to address a portion of the virtual address space which corresponds to data or programs not currently resident in the primary memory, necessitating a data transfer from secondary memory prior to successful completion of the instruction which generated the page fault. Page fault detecting means typically interrupt execution of the instruction which generated the page fault, resulting in the presence of invalid or erroneous data in the data registers of the computer. In another approach, the computer is allowed to complete the execution of the instruction which generated the page fault and any subsequent instructions dependent thereupon, a technique which also results in the creation of erroneous data in the data registers of the computer.

Each of the foregoing prior art techniques for operation subsequent to correction of a page fault requires either the reexecution of the instruction or sequence of instructions which generated the page fault so as to correct the information contained in the data registers, or the provision of special circuitry or other means for correcting the results of the execution of the instruction, again to correct the information in the data registers. All of the foregoing prior art techniques may slow down system operation because instructions must be reexecuted or other corrective instructions must be executed to correct erroneous data values. Thus, there is a need for a virtual memory system which does not require interruption or reexecution of instructions by the central processing unit in the event of a page fault condition.

Finally, there have been problems in obtaining measurements useful in memory allocation and management in prior art virtual memory systems. Many prior art systems employ a memory map which includes table entries for memory management purposes. These table entries typically include extra bits for measuring and/or labelling segments of information. These extra bits typically include a "modified" bit, which is set if a page was modified by processing since being placed in memory; a "used" bit, which is set whenever a page is referenced so that a metering routine can compile statistics on page use; and an "unused" bit which signifies that a page in memory has not been referenced by a program that demanded it, and therefore should not be removed until it has been used. The "used" bits are useful for determining a working set as described in the referenced Denning article. In most prior art virtual memory systems, these extra or "housekeeping" bits are maintained as map entries associated with the address translations which reference the virtual address space to the physical address space. However, in order to use the information contained in the housekeeping bits, it is necessary for the operating system or other program to access the housekeeping information either periodically or on a time multiplexed basis, so as to optimize the usage of the virtual memory. This requires processor overhead time and necessarily delays execution of desired applications programs. Accordingly, there is a need for a virtual memory management system which does not require dedication of main processor resources for performing virtual memory management and optimization.

SUMMARY OF THE INVENTION

The present invention overcomes these and other problems in virtual memory computer systems by providing an improved virtual memory computer architecture which facilitates the transfer of pages or segments from a secondary memory to the main computer memory. Briefly described, the present invention comprises a virtual memory computer system wherein pages of programs or data are transferred from a secondary memory via DMA directly to locations in the computer main or primary memory where such pages are needed to correct a page fault condition. Header portions and trailer portions are stripped from a transferred page automatically, with header portions being stored in a separate auxiliary "header" memory to facilitate network management. A dedicated second processing unit performs virtual memory management by maintaining a memory map, without requiring main processing unit or operating system overhead processing time.

More particularly described, the present invention comprises a main processing unit having an n-bit address field which is capable of addressing a first processor address space consisting of $2^n$ words of memory. Means defining an m-bit second processor address space, capable of addressing $2^m$ words of memory, are also provided, in the preferred embodiment with a second processing unit. The second processor address space is divided into a first portion and a second portion. Memory means having a physical address space smaller than the first processor address space is provided as a main or primary memory. A secondary bulk storage memory is accessible via a communications network. Also provided is an auxiliary third addressable or "header" memory. The first portion of the second processor address space corresponds to addresses in the third addressable memory, while the second portion of the second processor address space corresponds to addresses in the primary memory. A memory map translates addresses in the first processor address space and in the second portion of the second processor address space into addresses in the primary memory. Means are provided for retrieving a page or segment of digital data from the secondary memory and for storing the retrieved page at addresses in the second processor address space. The page retrieving means is responsive to generate addresses such that header portions of a retrieved page are stored at addressable locations in the third addressable memory, while the data portion is stored at addressable locations corresponding to the primary memory. Accordingly, it will be appreciated that the present invention is operative to automatically transfer the header portion of retrieved pages into a memory dedicated for overhead and/or network management, while the actual data needed by the main processing unit is automatically stored at locations accessible by the main processing unit through the memory map.

Still more particularly described, the present invention comprises a main processing unit for executing a stored applications program, and a second processing unit for maintaining the virtual memory apparatus and for handling data transfers to and from the secondary memory. In the preferred embodiment, the secondary memory comprises a network control and a mass storage device such as a disk drive. A common primary random access memory (RAM) is provided for storage of programs and data required by the main processing unit. The primary memory is accessible by both the main processing unit and the secondary processing unit. A memory management unit (MMU) arbitrates between the main processing unit and the second processing unit for access to the primary memory.

The main processing unit in the preferred embodiment is a popular microcomputer circuit which runs many popular and widely available microcomputer user application programs. Because of the virtual memory capability, the main processing unit operates as if it can access the maximum amount of primary memory possible as a function of its address space. In the disclosed embodiment, the primary memory ranges between 64 kilobytes (64K) to 512 kilobytes (512K), while the main processing unit, and commonly available programs therefor, can access one megabyte (1 Mbyte) of memory. For purposes of the discussion which follows, primary memory is 512K bytes.

In many processors architecturally configured for virtual memory capability, the occurrence of a page fault condition causes the status of the processor to be stored or saved while the page fault is corrected, after which the instruction which caused the page fault is restarted. Inasmuch as the microcomputer employed in the disclosed embodiment, a type 8088, is not designed to accommodate this "exception" handling or processing or to restart instructions, it will be appreciated that a particular advantage provided by the present invention is the adaptation of a conventional microprocessor without exception handling capability to virtual memory operation.

The memory management unit (MMU) translates addresses placed on the address bus of the main processing unit into addresses in the 512K primary memory. The MMU includes a memory map, which includes both status entries and "page" entries. The status entries include information as to whether a particular "page" of 512 bytes of memory in the main processing unit address space are currently resident in the primary memory. The MMU is responsive to the address provided by the main processing unit to access a particular location in the primary memory. In the event that the status entry for a particular page indicates that that particular page is not presently resident in memory, a page fault occurs and the main processing unit is not allowed to complete its operating cycle until the requested page is retrieved from a secondary memory and loaded into the primary memory.

A dedicated microcomputer second processing unit and direct memory access (DMA) device are employed for maintaining the memory map and for accessing information from the secondary memory via a communications network. The second processing unit is interrupted upon the occurrence of the page fault condition. The second processing unit then is operative to request the requested page over the network link, which is connected to a secondary memory. The secondary memory responds by providing the requested page over the network. The DMA loads the requested page directly into mapped locations in the primary memory.

Of particular significance in the disclosed embodiment is the configuration and relationship of the address spaces of the main processing unit, the second processing unit, and the DMA. Each page of information transferred over the network interface to or from the secondary memory includes a header portion and a data portion, as well as a trailer portion. The header portion contains information as to the network address of the secondary memory, the address in the secondary memory of the requested page, and other overhead information required to transfer information over the network. The data portion comprises the requested information. The trailer portion comprises a cyclic redundancy check (CRC) or other data integrity information. Since only the data portion is significant to the applications program running in the main processing unit, the header portion and trailer portion must be removed from an incoming page, or alternatively must be added to an outgoing page, prior to a network transfer. Thus, in the present invention the MMU is configured so that for an incoming page, the addresses generated by the DMA or the second processor automatically cause the header portion to be stored in the header memory, the data portion to be stored in addresses of the primary memory where the data is needed, while the trailer portion is stored in addresses which correspond to no actual physical memory, thereby causing the trailer portion to be deleted. Advantageously, therefore, the header portion in the header memory is available for convenient recall and readdition to the page when the page is outgoing. Thus, for outgoing pages, the second processing unit or DMA is configured to generate addresses for transferring a page from the primary memory over the network to the secondary memory to retrieve an appropriate header portion from the header memory, retrieve the appropriate data portion from the primary memory, and to automatically generate and transmit a CRC trailer portion.

Upon the successful correction of the page fault condition, the main processing unit is then released to complete its current operating cycle, and the data it requested through the memory management unit from the primary memory is provided on its data bus.

Accordingly, it is an object of the present invention to provide an improved virtual memory computer system.

It is another object of the present invention to provide a virtual memory system wherein dedicated hardware is provided for maintaining the virtual memory system without requiring overhead from the main processing unit hardware or operating system software.

It is another object of the present invention to provide a microcomputer system which is software compatible with the currently popular IBM PC microcomputer system, configured to appear architecturally as having the maximum primary memory virtually possible for such microcomputer as far as applications programs are concerned, yet which actually has a minimum-sized physical primary memory and accesses programs and data as required from a high speed disk memory.

It is another object of the present invention to provide an improved virtual memory computer system wherein the virtual memory operation and management is transparent to an applications program or operating system program for the main processing unit.

It is another object of the present invention to provide virtual memory capability for a conventional microprocessor which does not possess exception processing or handling capability.

It is another object of the present invention to provide a memory management system which facilitates network communications and resource sharing for remotely located satellite microcomputers.

It is another object of the present invention to provide a virtual memory computer system wherein only the data portion of a retrieved page or segment from a secondary memory is deposited directly in a predefined area of primary memory, and any header or trailer portions are automatically stored in appropriate auxiliary memories, thereby obviating any internal transfers or moves of the data portion commonly required in prior art systems to locate the requested information in a desired area of primary memory.

It is another object of the present invention to provide an improved virtual memory computer system wherein a page fault condition is detected prior to completion of a main processing unit machine address cycle, and the page fault condition corrected prior to completion of the address cycle, thereby obviating reexecution of instructions or correction of instruction results by the main processing unit.

It is another object of the present invention to provide a memory management unit which allows a plurality of processing units to access a common primary memory, thereby allowing unused areas of the address space of one processing unit to be used to access map entries in the address space of another processing unit.

These and other objects, features and advantages of the present invention may be more clearly understood and appreciated from a review of the following detailed description of the disclosed embodiment and by reference to the appended drawings and claims.

BRIEF DESCRIPTION OF THE DRAWINGS

Table I is a listing of signal names and definitions employed in the figures.

FIG. 1 is a general block diagram of an improved networked virtual memory computer system constructed according to the preferred embodiment.

FIG. 2 is a detailed block diagram of the virtual memory computer system shown in FIG. 1.

FIG. 3, consisting of FIGS. 3A and 3B, are diagrams illustrating the memory maps of the processing units, DMA, and primary memory employed in the preferred embodiment of FIG. 1.

FIG. 4 illustrates a map entry employed in the memory map of the preferred embodiment of FIG. 1.

FIG. 5 is a detailed schematic diagram of the main processing unit of the preferred embodiment illustrated in FIG. 1.

FIG. 7 is a detailed schematic diagram of the main or primary memory employed in the preferred embodiment of FIG. 1.

FIG. 8 is a detailed schematic diagram of the map memory employed in the preferred embodiment of FIG. 1.

FIGS. 9 and 10 are detailed schematic diagrams of the arbiter employed in the memory management unit of the preferred embodiment of FIG. 1.

FIG. 11 is a detailed schematic diagram of the network interface employed in the preferred embodiment of FIG. 1.

FIG. 12 is a flow chart illustrating program operation of the second processing unit employed in the preferred embodiment.

DETAILED DESCRIPTION OF THE PREFERRED EMBODIMENT

Figure 6B:
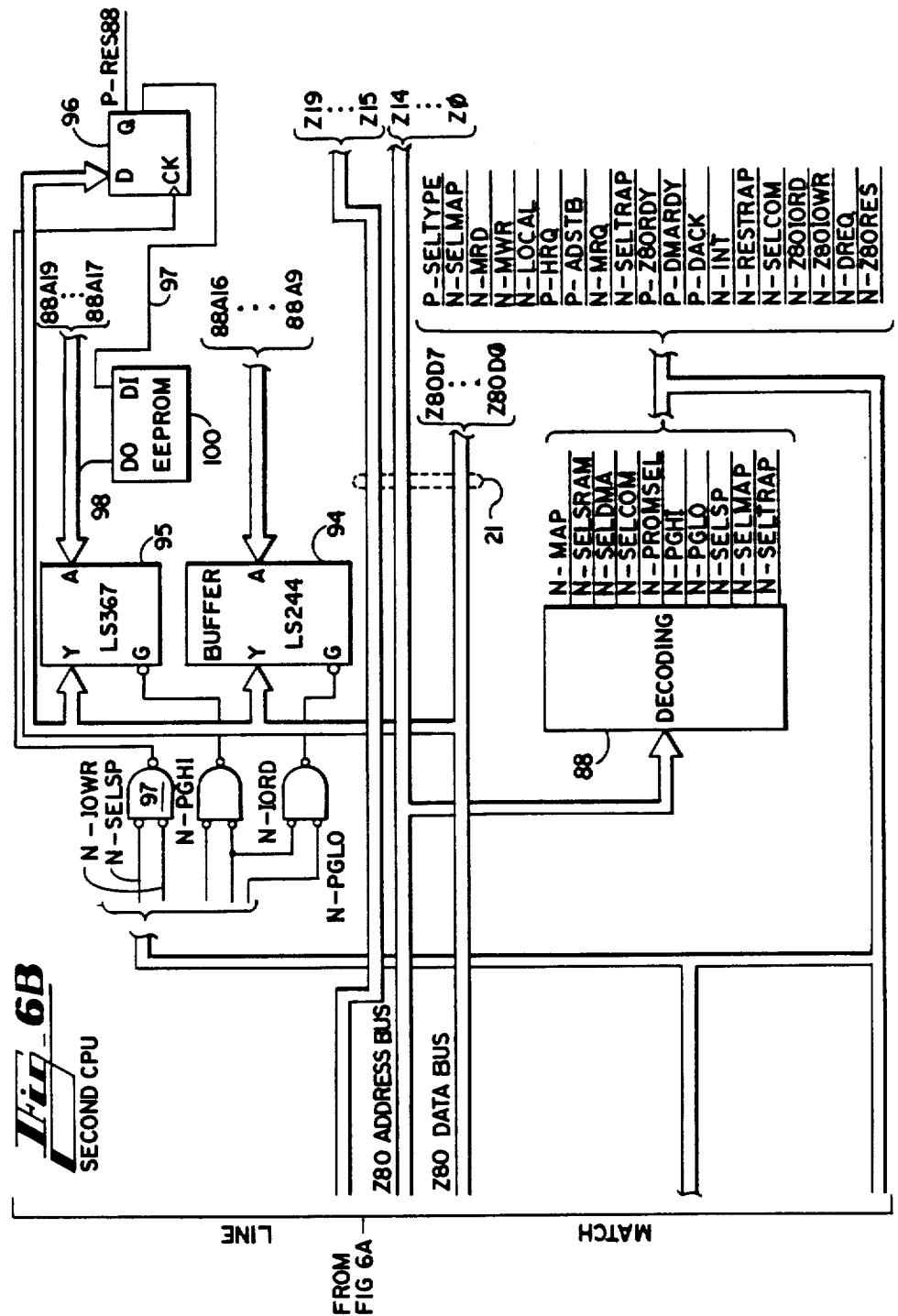
FIG. 6 is a detailed schematic diagram of the second processing unit employed in the preferred embodiment of FIG. 1.

Referring now to the drawings, in which like numerals indicate like elements throughout the several views, FIG. 1 illustrates a preferred embodiment of an improved virtual memory computer system 10 constructed in accordance with the present invention. The virtual memory computer system 10 comprises a first or main processing unit 12 which operates to execute stored programs desired by an operator of the system. The main processing unit 12 in the preferred embodiment is a type 8088 microcomputer circuit, manufactured by Intel Corporation of Santa Clara, Calif., together with various peripheral support circuits, which executes applications programs written for the currently popular International Business Machines Corp. (IBM) Personal Computer PC type microcomputer system.

The main processing unit 12 includes address, data, and control lines 13 which connect to a memory management unit (MMU) 14. The MMU 14 controls accesses by the main processing unit to a primary random access memory (RAM) 15. In addition, the MMU 14 performs an address translation function required in implementing virtual memory, wherein addresses provided by the main processing unit are translated into actual physical addresses in the primary memory 15.

The preferred embodiment of FIG. 1 further comprises a second processing unit 20, for implementing and maintaining the virtual memory feature of the present invention. The second processing unit in the embodiment of FIG. 1 comprises a dedicated second microcomputer circuit, a Z80 manufactured by Zilog Corporation of Cupertino, Calif. The second processing unit 20 is connected to the MMU 14 over address, data, and control lines 21. The second processing unit also accesses the primary memory 15 through the MMU for the purpose of using the primary memory as a primary storage device, and is also operative to maintain an address mapping memory contained in the MMU.

The second processing unit 20 is connected to a network control circuit 23 over lines 21. The network control 23 interfaces the computer system 10 with a communications network link 25, which allows the computer system to communicate with other processing units, data storage devices, or other peripherals connected to the network. In particular, it is contemplated in the disclosed embodiment that a secondary memory 27 may be connected to the network for mass storage of information at a site remote from the computer system 10. In the preferred embodiment, the secondary memory 27 is a mass data storage device such as a Winchester or "hard" disk, which stores large amounts of information, typically in the megabyte range.

The preferred embodiment of the present invention is operative to run programs prepared for execution on the main processing unit 12, by loading pages or segments of those programs stored in the secondary memory 27 into the primary memory 15 on demand by the second processing unit. Accordingly, the disclosed embodiment of the virtual memory computer system 10 described herein is known as a "demand paged" virtual memory system, in that pages or segments of a program to be executed by the main processing unit are retrieved from the secondary memory 27 only as the main processing unit outputs an address which calls for a page of information which is not currently resident in the primary memory 15. The MMU 14, in conjunction with the second processing unit 20, monitors the addresses provided by the main processing unit 12, and determines whether the information requested by the main processing unit, as manifested by the address placed on the address lines of the main processing unit, is currently resident in the primary memory 15.

If the MMU 14 determines that the requested information is not presently resident, a "page fault" condition occurs. The determination of a page fault is made by accessing a status entry in a memory map contained in the MMU 14, which stores status entries for a plurality of pages of data. The main processing unit is in essence halted mid-cycle, in that the memory cycle of the main processing unit is not completed since the requested information is not available. The second processing unit 20 then corrects the page fault condition by conditioning the network control 23 to request the non-resident page over the network from the secondary memory 27. When the requested information is provided over the network, a direct memory access (DMA) associated with the network control 23 and second processing unit 20 directly transfers the data over lines 21, through the MMU 14, and into the primary memory 15. The MMU then releases the main processing unit 12 to complete its memory cycle, and provides the addressed data on the data lines of the main processing unit.

Advantageously, the main processing unit 12 operates as if the data were provided directly in response to a memory request as reflected by the outputting of an address on the address bus of the main processing unit during an address cycle. In other words, the detection and correction of a page fault condition is completely transparent to and independent of the execution of the program by the main processing unit.

Turning now to FIG. 2, the preferred embodiment of FIG. 1 will be shown in greater detail. As described above, the preferred main processing unit 20 is a type 8088 eight-bit microprocessor. As known to those skilled in the art, the 8088 microcomputer is commonly employed in many currently popular microcomputer systems, foremost among them at the present time including the International Business Machines' (IBM) Personal Computer (PC). As will be further known, there is presently available a wide variety of computer end-user applications programs which operate on an IBM PC type microcomputer system. One of the objectives of the present invention is to provide a virtual memory system for a computer system which is software compatible with an IBM PC type computer, so that the wide selection of software available for the IBM PC can be used in connection with a virtual memory system. The advantages offered by such a configuration include minimizing the use of relatively expensive random access memory (RAM) circuits for a large number of terminals which can access a plurality of peripheral devices over the network link 25. In this manner, a single copy of a computer program stored in the secondary memory 27 can execute simultaneously on a plurality of satellite terminals without requiring a separate copy of the program on a removable storage medium such as a floppy diskette for each terminal, which is required in a conventional non-networked configuration.

The preferred microcomputer 12 in FIG. 2 includes a host of peripheral circuits which support the operation of the microcomputer circuit as a main processing unit in a microcomputer system. For example, as shown in FIG. 2, typically included in an IBM PC compatible configuration is an interrupt controller 30, a timer circuit 31, peripheral input/output (PIO) circuits 32, a serial communications circuit 35, and other input/output support (I/O) circuits 33. Optionally, a co-processor circuit 34 may also be provided. Each of the foregoing support peripheral circuits are connected to the main processing unit 12 over a 20-bit combined address and data bus 36.

Those familiar with the 8088 microcomputer will understand that the 8088 microcomputer bus 36 operates with time-multiplexed memory and input/output address and data being provided on the eight least significant bits with twelve additional dedicated address lines as the twelve most significant bits for a total address field of twenty bits. Accordingly, it will be understood that the address field or "address space" of the preferred 8088 type microcomputer consists of twenty bits, which allow the microcomputer to address in theory $2^{20}$ memory locations, or one megabyte. It will be further understood that the number of memory words addressable by the microcomputer 12 depends only on the number of bits in the address and is in no way related to the number of memory words actually available in the primary memory 15. For purposes of the present invention, the term "address space" shall mean the set of all possible addresses represented by a given address field. Accordingly, the address space for the preferred 8088 microcomputer circuit is $2^{20}$ (1 megabyte) memory locations.

In the preferred embodiment, the support peripheral circuits employed to support the 8088 main processing unit 12 include a type 8259 interrupt controller, a type 8253 timer, a type 8255 PIO, a type 8250 serial communication circuit, and a type 8087 coprocessor circuit, all manufactured by Intel Corporation except the 8250 which is manufactured by National Semiconductor Corporation. Inasmuch as the structure and functioning of these types of support circuitry will be understood by those skilled in the art, no further discussion of their operation will be provided herein. It will therefore be understood that the preferred main processing unit 12 includes such support peripheral circuits as shown in FIG. 2 required to configure the 8088 main processing unit 12 in a manner compatible hardware-wise with an IBM PC microcomputer system. Specifications for such a microcomputer system are published as "Personal Computer XT Hardware Reference Library—Technical Reference", Revised Edition, April 1983, Part No. 6936808, and "Hardware Maintenance and Service Manual", Part No. 6936809, IBM Corporation, the disclosures of which are incorporated herein by reference and made a part hereof. Accordingly, the discussion which follows will concentrate on at portions of the preferred embodiment which differ from the conventional IBM PC microcomputer system architecture.

The PIO 32 shown in FIG. 2 is configured to provide keyboard input to the main processing unit 12 from a keyboard 38. Signals from the actuation of the keyboard are provided to a keyboard buffer 39, which is connected to the PIO 32. As known to those skilled in the art, PIO 32 generates an interrupt to the main processing unit when a key is depressed, and the main processing unit interrogates the PIO to receive the keystroke data. The keyboard buffer 39 accumulates keystrokes on the keyboard 38 to ensure that if the 8088 is temporarily halted while a page fault condition is being corrected, no keystrokes will be lost. In the preferred embodiment, keyboard buffer 39 operates by transmitting keystroke information to the second processing unit 20 via lines 21 when the main processing unit 12 is temporarily halted, the second processing unit stores the keystrokes in memory, and stored keystroke data is provided to PIO 32 when the main processing unit resumes operation and queries the PIO. The construction of such keyboard buffers will be known to those skilled in the art, and will not be described further herein.

Still referring to FIG. 2, the address and data bus 36 of the 8088 is provided to a latch 40 and a bus transceiver (XCVR) circuit 41 to separate the address from the data. As described in greater detail in connection with FIG. 5, an address latch enable (ALE) signal is provided as a control signal from the 8088 at a predetermined time during the machine operating cycle, which is used to strobe the address information on the address and data lines 36 into a storage register. At a different time in the operating cycle of the 8088, a data enable (DEN) signal is provided to enable the appropriate bits of data on the address and data lines 36 to be treated as data instead of as an address. Accordingly, it will be understood that the outputs of latch 40 comprise twenty address lines designated in FIG. 2 as 88A0–88A19, while the outputs of the transceiver circuit 41 comprise eight bits of data designated in as 88D0–88D7.

The address lines 88A0–88A19 and data lines 88D0–88D7 are provided to a CRT control circuit 42, which controls the operation of a CRT monitor 43. In the preferred embodiment, the CRT control 42 is configured to accept commands provided from the 8088 to generate a color display. Accordingly, it will be understood that the preferred CRT control circuit 42 is a color monitor control circuit, the operation and construction of which will be known and understood by those skilled in the art, and will not be described further herein.

In conjunction with CRT control circuit 42 is a 32K random access memory (CRTRAM) 45 dedicated for storage of screen information for display on the CRT. The 32K CRTRAM 45 is separately addressable by the main processing unit 12. Stated in other words, the map of the address space for the 8088 main processing unit microcomputer 12 includes a 32K block of addresses which are dedicated for reading and writing of information on the CRT. Of particular significance in the preferred embodiment, and as is described in greater detail below, the addresses in the address space for the CRTRAM are not handled by or translated through the MMU 14.

The address lines 88A0–88A19 are also provided to the MMU 14 so that addresses which correspond to data contained in the primary memory 15 may be retrieved. The MMU 14 multiplexes the address lines 88A0–88A19 with a 20-bit derived address provided from the second processing unit 20, with an address multiplexer circuit 50. The output of the multiplexer 50 is provided to access map entries contained in a map memory 51. The map memory 51 provides a set of output addresses on lines 52 to the primary memory 15, and comprise the actual physical addresses for the primary memory. Data received from or transmitted to the primary memory 15 on lines 88D0–88D7 is passed through a buffer 53 to the data input/output lines 56 of the primary memory 15, to allow for data multiplexing with the second processing unit as will be described later.

The MMU 14 further comprises an arbiter circuit 54, which controls accesses to the primary memory 15. The arbiter is responsive to memory requests originating either from the main processing unit 12 or from the second processing unit 20, and allows one or the other of these processing entities to have access to the map 51 for accessing the primary memory 15. It should also be understood that the address and data buses of the second processing unit 20 include a direct memory access (DMA) circuit 55 which is operative to transfer data to or from the network link 25 directly into the primary memory 15; accordingly, it should be understood that the arbiter 50 is also responsive to requests originating with the DMA 55 to allow the DMA access to the primary memory 15.

The second processing unit 20 shown in FIG. 2 includes a 16-bit address bus, enabling the Z80 to directly address $2^{16}$ or 64K of main memory, and an 8-bit data bus. However, in the preferred embodiment of the present invention, the Z80 or second processing unit 20 is configured to provide twenty bits of address information on lines Z0–Z19, in a manner which will be described in greater detail below. The Z80 can therefore theoretically address the entire one megabyte address space of the 8088. The data lines of the Z80 or second processing unit 20 are designated as Z80D0–Z80D7.

Various support peripheral circuits are connected to the address and data bus 21 of the second processing unit to enable the Z80 to perform its tasks of maintaining the memory map 51. For example, a programmable read-only memory (PROM) 60 containing the program for the second processing unit 20 is connected to these address and data buses. A local static random access memory circuit (RAM) 61 is provided for storage of header information for pages received from or sent over the network link. Thus, local RAM 61 is an auxiliary third addressable memory used as the header memory.

The network control circuit 23 comprises a DMA circuit 55, as well as a serial communications circuit (SCC) circuit 62, plus network interface circuitry 63 which physically connects to the network link 25.

The data bus of the second processing unit Z80D0–Z80D7 is also shown in FIG. 2 as connecting to the keyboard buffer circuit 39. As described above, keystrokes from the keyboard 38 are actually read and stored by the second processing unit 20 in the event that keystrokes are occurring at a more rapid rate than can be processed by the PIO 32 to the main processing unit 12.

Finally in FIG. 2, the address and data lines from the second processing unit 20 are multiplexed for accessing the primary memory 15. As illustrated, the address lines Z0–Z19 are provided to the address multiplexer 50, so that a 20-bit address from the second processing unit 20 can be employed to access the primary memory 15 through the map 51. Additionally, the data lines Z80D0-Z80D7 are provided to a buffer circuit 64, the outputs of which are wire-ORed with the outputs of buffer 53, which connects to the data input/output lines 56 of the primary memory 15.

A "back door" buffer 65 is also connected between the data lines Z80D0-Z80D7 of the second processing unit 20 and the map address lines 52 of the primary memory 15. The back door buffer 65 allows an indirect method for accessing the memory map 51 for updating and/or correcting entries contained in the map memory. The construction and operation of the back door will be described in greater detail in connection with FIG. 8.

Memory Mapping

Turning now to FIG. 3, there will be discussed the mapping of the address spaces of the main processing unit and of the second processing unit onto the primary memory. As described above, the preferred type 8088 microcomputer is capable of addressing one megabyte of memory locations, because of its 20-bit address bus. Accordingly, the set of possible addresses from the main CPU range from 00000-FFFFF hexadecimal. In a typical IBM PC compatible configuration, 640K of this address space is employed for random access or main memory, with addresses ranging from 00000-B8000. The next 32K addresses, ranging from B8000-C0000, are dedicated for the CRT display. As shown in FIG. 3, these 32K of addresses directly access the CRTRAM 45. All addresses above C0000 are dedicated for certain predefined functions in an IBM PC compatible system, with certain exceptions. For example, addresses F0000-FFFFF denominate addresses in an IBM PC which access the basic input/output system (BIOS); those familiar with the IBM PC architecture will understand that any addresses in this range access dedicated programs stored in programmable read-only memory in an IBM PC. In the preferred embodiment of the present invention, these addresses F0000-FFFFF serve the same function, except that there is no dedicated PROM for the BIOS, and any addresses from the main processing unit access the primary memory 15 through the MMU. This area is therefore designated as "virtual ROM" in FIG. 3, to designate that the memory for the BIOS is virtual.

The addresses ranging from D0000-F0000 are designated as "virtual accessories". These addresses provide a capability in the disclosed embodiment not possible in a conventional IBM PC. The main processing unit can run programs having addresses in the "virtual accessories" address space, while many conventional application programs which are normally resident in the 640K address space run as usual without interference from any virtual accessories. For example, a program which causes the system to emulate a particular operating system or a particular type of terminal can be configured to operate in this address space. Other currently popular features such as pop-up calculators or notepads can operate in the virtual accessories address space without interfering with the execution of a normal IBM PC applications program. Accordingly, it will be understood that the virtual accessories address space allows the main processing unit to perform functions which are not possible in a conventional IBM PC architecture.

All addresses in the main CPU address space other than the 32K CRTRAM addresses are translated into physical memory addresses through the memory map 51. The memory map translates addresses in the 8088 address space into physical addresses in the primary memory address space. In the preferred embodiment, data is stored in the primary memory 15 in logical pages of 512 bytes. This corresponds to the disk sector size for a conventional IBM PC, so each logical page presents the appearance of constituting a disk sector. There are provided 2048 (2K) logical pages, each page containing 512 bytes of information, to constitute the entire one megabyte of addressable information. However, the primary memory in the disclosed embodiment only contains 512K of actual memory, so that at any one given time, only 1024 pages out of a possible 2048 are resident in memory. The memory map 51 comprises 2K logical entries × 16 bits of information, organized as 4K × 8. Accordingly, the memory map contains one entry for each 512 byte page which can be accessed by the main processor.

Also illustrated in FIG. 3A is the mapping of the Z80 second processor onto the primary memory physical address space. As known to those skilled in the art, the addresses of the preferred Z80 microprocessor employed in the disclosed embodiment range from 0000-FFFF, a 64K address space. The lower 16K of addresses, from 0000-4000 correspond to addresses of a 16K read-only memory, which contains the program for the Z80. Addresses 4000-4FFF correspond to addresses in the map 51, for purposes of accessing and maintaining the map memory. These 4K addresses operate to access the map entries, and do not access the main memory through the memory map.

Addresses between 6000-8000 correspond to locations in the third or auxiliary memory which is used to store header information for pages transferred into and out of the main memory. This auxiliary or third memory is also denominated the "local RAM".

Addresses above hexadecimal 8000 constitute a 32K "window" for accessing the primary memory 15 through the map 51. It will be recalled from the discussion above that there are no map entries for the 32K addresses in the 8088 address space which correspond to the CRTRAM 45. Accordingly, it will be understood that addresses in the Z80 address space between 8000-FFFF correspond to the CRTRAM addresses in the 8088 address space, and access map entries which would otherwise be used by the 32K addresses which have been dedicated for the CRTRAM.

Stated in other words, the second processor can access 32K addresses in the primary memory due to the fact that there are no map entries provided for virtual addresses B8000-C0000 in the 8088 address space, which correspond to the 32K CRTRAM 45. Accordingly, it will be understood that the Z80 or second processor can access the primary memory 15, in logical pages of 512 bytes, through the map 51 in a manner similar to the accessing of the primary memory by the main processor. The main processor can never actually address these 32K addresses in main memory since it is hard-wired to the CRTRAM 45, so the Z80 can utilize map entries corresponding to these 64 logical pages for its own purposes. Thus, it will be appreciated that the upper 32K addresses of the Z80 correspond to a group of map entries which do not conflict with map entries being used by the main processing unit in its address space. It will also be appreciated that the upper 32K of memory for the second processor is also virtual memory.

In the preferred embodiment, the second processor uses this "window" space to facilitate mapping of addresses. For example, when a page is to be brought in over the network and placed in the primary memory 15, the page will contain the header information for the page. As described above, a DMA is employed to transfer pages from the secondary memory into the primary memory. In the preferred embodiment, the DMA is conditioned to start inputting data at addresses which correspond to the local RAM 61; accordingly, the header of a page automatically is transferred into the auxiliary local RAM 61. Addresses following the header are set up to fall within the 32K window in the Z80 address space; such addresses correspond to addresses in the primary memory obtained through the memory map, and are placed in the primary memory according to the map entries. Thus, it will be appreciated that the desired information is automatically stored at addresses in the primary memory corresponding to addresses which have been accessed by the main processing unit.

It should also be understood that an input page when brought in over the network also includes a CRC trailer at the end of the page. The map entries corresponding to addresses higher than the last byte of a transferred page contain a "write protect" indication, so that the CRC is stripped off. In other words, the map entry corresponding to address hexadecimal 8201 (8000+512 (decimal)+1), plus the entries corresponding to the number of words in the page trailer, in the Z80 or second processor address space is always write-protected. In this manner, the data portion is automatically stored at the appropriate locations in the primary memory wherein the requested page is desired, while the map entry above the last byte of the page is always write-protected so that the CRC information is not stored.

The foregoing configuration is advantageous in the preferred embodiment in that a requested page of data is placed directly in a desired location in the primary memory with header and trailer portions automatically removed. This configuration obviates movement or relocation of the 512-byte page to effectuate header and trailer removal, which is frequently required in prior art systems wherein the entire page including header and trailer are first placed in a buffer in main memory, and then the desired data portions are relocated or "extracted" to a desired location. In the present invention, it will therefore be appreciated that when a page of data is obtained over the network, the header is stored automatically in the local or static memory 61 (FIG. 2), the desired 512 bytes of useful data are stored directly in the primary memory 15 corresponding to an appropriate map entry, while the trailer is automatically stripped off since the map entry immediately above the map entry which placed the data in the appropriate location is always designated as write protected, causing the trailer to not be stored.

A similar operation occurs when a page is to be transferred out of the primary memory for restorage in the secondary memory. As will be understood by those skilled in the art, virtual memory systems frequently include an indication as to whether a particular page or segment is "dirty", i.e., a page which has been modified by the main processor. As shown in FIG. 4, each map entry contains a 10-bit page address, which selects a physical 512 byte page in the main memory. It will be recalled that the one-megabyte address space of the main processing unit corresponds to a total of 2048 logical pages. In the disclosed embodiment, the main memory is 512K bytes, which corresponds to 1024 512-byte pages; these pages can be addressed with an 10-bit page address.

FIG. 4 illustrates the information contained in a map entry. It will be recalled from the discussion above that the memory map 51 is constructed with two 2K×8 random access memories, each map entry therefore constitutes sixteen bits of information. As described above, ten of these bits PAGE0-PAGE9 are designated as a page address for selecting a particular page of 512 bytes in the primary memory 15.

Also included in each map entry are four status bits. The V status bit provides an indication whether a page "Valid", that is, presently resident in the primary memory. This status bit is set by the second processing unit 20 when a particular page is stored in the primary memory, and cleared if a page is removed by overwriting or transmitting modifications to the page back down the network to the secondary memory. The V status bit thus indicates a page fault condition if a page is not resident in the primary memory.

An "Accessed" status bit A is also provided, and denotes whether the page has been accessed by the main processing unit. Periodically, the second processing unit monitors the A flag of each page in the map memory to determine whether the particular page has been used. In the event a page has not been used within a predetermined time, the page can be removed from the memory.

A "Written" bit W indicates whether the page has been modified by the main processing unit during execution of an applications program and is therefore "dirty". This bit is set by the MMU upon the occurrence of a write pulse originating at the main processing unit. In the event that a page is indicated as being "dirty", the page must be transmitted over the network link to the secondary memory so that the modifications can be permanently recorded on the disk.

A "write Protect" bit P is provided to indicate that the page is write protected, that is, cannot be written by the main processing unit. The P bit is used by the MMU to prevent any attempts by the main processing unit to alter the data in the page.

The MAPTYPE bit indicates which one of two possible 8088 address spaces to which the particular page belongs. By providing each page with a MAPTYPE bit, two separate one-megabyte virtual address spaces can be maintained in the disclosed embodiment, so as to provide the impression to a user that up to two full megabytes of main memory can be addressed. Advantageously, therefore, a user can load two large application programs in separate one-megabyte address spaces, and switch conveniently and quickly between the two application programs without having to cease operation of one program and load the other application program into memory.

Finally, a "Trash" bit T is provided in the status word to indicate that the page is considered expendable and can be written over by a new page without first saving the page. For example, if the page represents a portion of an application program for the main processing unit which is permanently stored on disk, there is no need to ascertain whether the page is data which must be saved, and the page can therefore be discarded if room is needed. As described in greater detail in connection with FIG. 12, if the T bit is found to be true in a page which is a candidate for deletion, the page will automatically be overwritten.

Main Processing Unit

FIG. 5 is a detailed schematic diagram of the first or main processing unit 12 and its supporting circuitry. For purposes of discussion of the detailed schematic diagrams, the following notation is employed throughout the several figures to identify signal names. Table I is a listing of the signals and the figure number in which each signal first appears. In the figures, many of the signals are preceded by a "N" or "P". Signals which begin with "N" are negative-true or low-going signals, while signals which begin with "P" are positive-true or high -going signals in the conventional five-volt logical notation system. Signals without a prefix are generally data or address buses, the polarity of which depends upon the particular components employed. Finally, those skilled in the art will understand that a signal having a "N" prefix can be generally converted into a signal with a "P" prefix by passing the signal through an inverter, and vice versa.

It should also be understood that the circuitry described herein operates in a synchronous manner, with clocking of various gates and registers occurring as a function of multi-phased and polarity of clock signals. The phases, polarities, duty-cycles, and frequencies of the clock signals, designated in the figures as "CLK", vary as a function of requirements for particular circuit components employed in the disclosed embodiment. Accordingly, it should be understood that a conventional clock generating circuit is employed in the preferred embodiment to provide clock pulses at appropriate phases, polarities, duty-cycles, and frequencies, as called for in the technical specifications of the identified circuit components. Those skilled in the art will understand and appreciate that clock generating circuitry required to properly operate the identified circuit component forms no part of the present invention, inasmuch as techniques for generating clock pulses are known to those skilled in the art, and will therefore not be described further herein.

It will therefore be understood that the preferred microcomputer circuits employed in the disclosed embodiment, a type 8088 as the main processing unit 12, and a type Z80 as the second processing unit 20, require clocking pulses at particular polarities, frequencies, phases and duty cycles. In the disclosed embodiment, a 4.77 mHz, thirty-three percent duty cycle clock is provided for the 8088, while a 4.77 mHz, fifty percent duty cycle is provided for the Z80. In addition, a 5.73 mHz, fifty percent duty cycle clock is provided for operation of the identified network communications circuit components.

Referring to FIG. 5, in the preferred embodiment the main processing unit 12 includes a type 8088 8-bit microprocessor 12a together with a type 8288 bus controller 12b, also manufactured by Intel, to configure the microcomputer in the "maximum" mode (as defined in the technical specifications for such circuits). Those skilled in the art will understand that use of the 8288 bus controller in conjunction with the 8088 CPU 12a is employed to facilitate interface of the preferred microcomputer circuit to external bus transfers and to provide flexibility in system configuration. It will be further understood that the preferred bus controller provides command and control timing generation as well as bus drive capability.

The main processing unit 12 provides multiplexed address and data information on bus 36 to latches 40, which provide an output address bus 88A0–88A19. In the preferred embodiment, latches 40 comprise three type 74LS373 octal D-type transparent latches 40a, 40b, 40c with three-state outputs, manufactured by Texas Instruments, Inc. of Dallas, Tex. Each of latches 40a, 40b, 40c includes an enable (C) input which causes the outputs Q to follow the data D inputs when the signal is high. When the enable is low, the Q outputs will be latched at the levels that were set up at the D inputs. The C enable input is connected to the address latch enable (ALE) signal from the bus controller 12b, which causes the latches 40 to retain the address information from the bus 36.

The address and data bus 36 is also connected to a bus transceiver 41, which receives the least significant eight bits of the bus and provides this data as output data lines 88D0–88D7. In the preferred embodiment, the bus transceiver 41 is a type 74LS245 octal bus transceiver with three-state outputs, manufactured by Texas Instruments. The preferred bus transceiver includes a direction input DIR as well as an enable (G) input. The DIR input is controlled by the signal DT/R provided by the bus controller 12b, to determine whether data is transferred onto bus 36 from the lines 88D0–88D7, or in the reverse direction. The enable (G) input in controlled by NAND-gate 71. One input to NAND-gate 71 is connected to the output of an OR-gate 73, which provides an output during the presence of a signal denominated IO. This signal is true when the main processing unit 12 is setting up for an I/O transfer.

The other input to OR-gate 73 is the signal CRT, which is provided from a decoder circuit 74. Decoder 74 provides the signal CRT when the main processing unit 12 has addressed the CRT control circuit 42 (FIG. 2), and is preparing to transfer a command or data to the CRT display.

The other input to NAND-gate 71 is connected to AND-gate 72, which provides a signal during the concurrent presence of the signal DEN (data enable) provided from the bus control circuit 12b, and the SP/EN signal being false (high). The SP/EN signal is provided from an interrupt controller (not shown) which interrupts the main processing unit in response to actuation of the keyboard, completion of a disk data transfer, and the like. When the interrupt controller is to take control of the address and data bus 36, the SP/EN signal is made false, thereby preventing any devices other than the interrupt controller from placing data on the bus 36 while the interrupt controller places the interrupt vector on the bus.

Also shown in FIG. 5 are means for requesting a memory access by a signal BUSRAM. This signal is true whenever the main processing unit 12 attempts a memory access to an address other than the 32K CRTRAM. In other words, the signal BUSRAM is true for each memory access by the main processing unit other than an access which falls between the addresses B8000–C0000.

The BUSRAM signal is created as follows. Address lines 88A15 and 88A16 are provided to a NAND-gate 76, the output of which is connected to the enable (EN) input of a decoder circuit 77. The preferred decoder is a type 74LS138 three to eight line decoder, manufactured by Texas Instruments. The select inputs A, B, C are connected to the address lines 88A17, 88A18, and 88A19, respectively. The other enable (EN) input of decoder 77 is connected to the IO signal line. When address B8XXX hexadecimal (X=irrelevant) appears on the address lines, a signal occurs on the Y5 output line of decoder 77, as the signal CRTRAM. The CRTRAM signal is connected to the direct set input (S) of a D-type flip-flop 80. It will be understood that a low signal on the CRTRAM line forces the BUSRAM signal to go high, thereby removing the BUSRAM signal.

The flip-flop 80 is set in the following manner when a memory access is desired. The clock input CK of the flip-flop 80 is connected to the output of an AND-gate 83. During the concurrent presence of the clock signal and either a memory read or memory write, as manifested by the signals 88MRD or 88MWR through negated NOR-gate 84, the flip-flop 80 will clock in the output of NAND-gate 82. Status control lines S1 and S0 from the 8088 main processing unit 12 are connected to the inputs of a negated OR-gate 81, whose output is connected to one input of a NAND gate 82. Status control line S2 is connected to the other input of NAND gate 82. A low will occur on the D input whenever S2 is true (high) and either S1 or S0 are true, thereby indicating a memory access. The 8088 S2 signal will be low for an interrupt acknowledge or an I/O read or write, and high for a memory read or write.

As described above in connection with FIG. 2, the main processing un it 12 operates in conjunction with various other peripheral component circuits such as CRT control 42, interrupt controller 30, I/O support 33 for a printer, etc., so as to functionally emulate an IBM PC. Inasmuch as the architecture of this microcomputer system will be available to those skilled in the art, there will be no further discussion of components employed in the preferred embodiment for IBM PC hardware compatibility.

Second Processing Unit

FIG. 6 illustrates the second processing unit 20, which is employed in the preferred embodiment for maintaining the memory map. In addition, the direct memory access (DMA) circuitry 55, which shares the address space of the second processing unit, is illustrated.

It will be recalled from the discussion above that the second processing unit 20 and DMA 55 are configured to "share" the address space of the main processing unit in that both of these processing activities access the primary memory 15. As described above, the preferred embodiment employs a type Z80 8-bit microcomputer having a 16-bit address space. As shown in FIG. 6, the address bus 85 of Z80 microcomputer 20 comprises lines A0-A15; of these lines, A0-A14 correspond to lines Z0-Z14 of a derived 20-bit address bus Z0-Z19, which are used to address the primary memory through the memory map.

Connected to the Z80 address bus 85 on lines Z80A-0-Z80A15 is decoder circuit 88, which decodes addresses placed on the address bus for selection of input-/output devices and for selection of various peripheral devices having dedicated addresses. The structure and functioning of address decoder devices will be known to those skilled in the art.

The data bus 86 from the second processing unit 20 comprises the lines Z80D0-Z80D7. These lines are connected to the D inputs of a latch circuit 90, a type 74LS273 octal D-type flip-flop manufactured by Texas Instruments. The Q outputs of latch 90 are the derived address lines Z15-Z19. Data from the Z80 data bus is clocked into the latch 90 with the signal WMAP from negated NAND-gate 93. This signal goes true during the concurrent presence of the MAP signal and the Z80IOWR signal. The MAP signal is an output of decoder 88. When the second processing unit 20 desires to set up the address lines Z15-Z19, it places the appropriate data on its data bus 86 at an address on its address bus which corresponds to the MAP signal, and performs a memory write, which results in the signal Z80I-OWR from buffer 91. Bus buffer 91 in the preferred embodiment is a type 74LS240 octal buffer with three-state output, manufactured by Texas Instruments.

It will also be noted that latch 90 provides an output SELTYPE. In the preferred embodiment, the second processing unit 20 can select two different 1 megabyte virtual address spaces for the main processing unit 12, creating the appearance to an operator that the main processing unit is simultaneously running two different applications programs (or more, depending on memory requirements of the application programs). The second processing unit 20 makes the SELTYPE signal true in order to shift the main processing unit between these two spaces, as will be described further in connection with FIG. 9.

The DMA employed in the preferred embodiment is configured to perform direct memory accesses to any location within the primary memory 15. These addresses are maintained and set up by the second processing unit 20 indirectly through the DMA circuit 55. Accordingly, a latch 92 holds data received over the data bus and provides address lines Z8-Z15 for a DMA transfer. In the preferred embodiment, latch 92 is a type 74LS373 octal D-type transparent latch with three-state outputs, manufactured by Texas Instruments. The enable input (G) is connected to the address strobe (ADSTB) signal provided by the DMA circuit 55, while the output control (OC) is driven by the AENDMA signal, also provided from the DMA 55.

The preferred DMA circuit 55 employed in the disclosed embodiment is a type 8237 programmable DMA controller manufactured by Intel, the operation of which will be understood by those skilled in the art. It will therefore be understood that the address enable (AEN) output, which is the AENDMA signal, enables latch 92 containing the eight address bits Z8-Z15.

The second processing unit 20 is also able to monitor the address activity on the address lines 88A9-88A19 from the main processing unit 12. Accordingly, the address lines 88A9-88A16 are connected to the inputs (A) of an octal buffer 94 while the address lines 88A17-88A19 are connected to the inputs (A) of a buffer 95. Buffers 94, 95 in the preferred embodiment are type 74LS244 octal buffers and line drivers with three-state outputs, or type 74LS367 hex buffers, manufactured by Texas Instruments. The outputs Y of buffers 94, 95 are connected to the Z80 data bus lines Z80D0-Z80D7. The address lines 88A9-88A19 are enabled onto the Z80 data bus when the enable (G) input of the buffers is made low. This function occurs by prevision of the signals PGLO or PGHI from decoder 88, concurrently with the IORD signal, indicating a read command from the second processing unit.

The second processing unit 20 controls the reset line RES88 of the main processing unit 20 via latch 96. Data provided to the D input of the latch 96 is clocked in by negated-NAND gate 97 during the concurrent presence of the signals IOWR and the signal SELSP from decoder 88. The preferred latch 96 employed in the disclosed embodiment is a type 74LS174 6-bit latch, which provides additional Q output lines 97.

An electrically alterable or erasable programmable read-only memory (EEPROM) 100 is employed to store system configuration default information which may be desired by an operator. For example, certain predefined default mode configurations for IBM PC compatible operation such as network address, default disk drive, screen mode, character size, input/output device selection, and the like may be selected by the operator and permanently stored. Output lines 97 from the latch 96 are connected to the data in (DI) input of the EEPROM 100, while the data out (DO) output on line 98 is connected to one of the A inputs of buffer 95, so that the contents of the EEPROM can be read under commands provided by one of the lines 97. In the preferred embodiment, the EEPROM is a type 9306 nonvolatile 16×16-bit memory manufactured by National Semiconductor Corporation of Santa Clara, California.

Also shown in FIG. 6 is the program memory 60 for the second processing unit. In the preferred embodiment, program memory 60 is a type 2764 8K×8 erasable programmable read-only memory (PROM), manufactured by Hitachi America, Ltd. of San Jose, Calif. This circuit is selected for reading by the PROMSEL signal from decoder 88.

The header or local memory 61 employed in the preferred embodiment for storage of page header information is a type 6264 8K×8 static random access memory, manufactured by Hitachi America, Ltd. of San Jose, Calif. This circuit is selected for a read or write operation by the SELSRAM signal from decoder 88.

A power-up timer circuit 102 is provided for resetting the second processing unit 20 and related peripherals when power is initially provided to the circuitry. Construction of such power-up reset circuits will be known to those skilled in the art.

Main or Primary Memory

FIG. 7 illustrates the main or primary memory 15. In the preferred embodiment, the memory 15 comprises 512K 8-bit bytes of memory storage, arranged as two 9×256K arrays or banks. Eight bits are for data, while the ninth bit is employed for storage of byte parity. The preferred memory circuits employed in the disclosed embodiment are type HM50256 256K×1 dynamic random access memories, manufactured by Hitachi American Ltd. It will be understood that the address lines to the preferred memory circuits use a multiplexed row/column addressing scheme, wherein a row address is strobed into the circuit, followed by a column address. It will be further understood that periodic refreshing by strobing each row with the row address strobe (RAS) input is required approximately every four milliseconds to preserve data. Memory refresh techniques being known to those skilled in the art, will not be described further herein. The signal RFSH is provided in the preferred embodiment for this purpose.

The address lines 52 for accessing the memory 15 are provided from the map 51 (FIGS. 2, 8) for the higher order or page addresses, while the lower order address lines correspond directly to lower order address lines received multiplexed from the main processing unit 12 and the second processing unit 20. As shown in FIG. 7, signals denominated PAGE0–PAGE9 correspond to page selection address lines from the map memory 51 (FIG. 8), also shown in FIG. 7 as lines RA9–RA17. The eight least significant bits of the memory address, RA0–RA7, are provided from the outputs of multiplexers 112, 113; address line RA8 is provided from the output of multiplexer 133 (FIG. 8), which multiplexes lines 88A8 and Z8. Thus, the address lines RA9–RA17 select a 512 byte "page" in memory, while address lines RA0–RA8 select particular bytes. The lower address lines 88A0–88A3 are multiplexed with address lines Z0–Z3 from the second processing unit at multiplexer 113, and the lines 88A4–88A7 are multiplexed with the 1 address lines Z4–Z7 at multiplexer 112. Selection between the address lines from the main processing unit and the second processing unit is made with the signal ENZ80AD, which is connected to the select (S) input of the multiplexers 112, 113, and 133.

Inasmuch as the row and column addresses for the preferred RAM circuits are multiplexed, three multiplexers 115, 116, 117 are employed for this purpose. The address lines RA8–RA16 (PAGE0–PAGE9) are provided to the B input of the multiplexers 115, 116, 117, while the address lines RA0–RA7 and RA17 are connected to the other multiplexer input A. The outputs Y of the multiplexers 115, 116, 117 are designated as address lines CA0–CA8, and are connected to the A0–A8 address inputs of the bank of primary memory circuits 15. Selection between row and column addresses (inputs A or B) is made with a signal CASDDR, which alternatively selects lines RA8–RA16, or lines RA0–RA7 and RA17.

Since two banks of 256K memory chips are employed to obtain 512K, separate column address strobe signals CAS0–CAS1 are provided to strobe the column addresses for the respective upper and lower 256K banks.

The data outputs of the primary memory bank 15 are provided on lines 120 to bus transceivers (XCVR) 121, 122. The preferred bus transceivers 121, 122 are type 74LS245 octal bus transceivers with three-state outputs, manufactured by Texas Instruments. Transceiver 121 enables the data lines 120 onto the second processing unit data bus lines Z80D0–Z80D7, while transceiver 122 enables the data lines 120 onto or from the main processing unit data lines 88D0–88D7. The direction (DIR) input of the transceiver 121 is controlled by the MRD signal from the second processing unit 20, which determines whether data is transferred to or from the primary memory. The direction (DIR) control for transceiver 122 is provided from the signal 88MRD from the main processing unit 12.

A NAND-gate 123 enables data movement through transceiver 121 during the concurrent presence of the LOCAL signal from the Z80 second processing unit 20 and the ENZ80AD signal, which indicates a data transfer with the second processing unit. It will be recalled from the discussion of FIG. 3A that the second processing unit 20 can access the primary memory 15 at addresses above hexadecimal 8000; accordingly, the LOCAL signal occurs when the second processing unit outputs an address within this "window".

Similarly, data from the primary memory 15 is transferred to or from the 8088 main processing unit data lines 88D0–88D7 when the BUSRAM signal is true, and there is not a transfer indicated as originating with the second processing unit. Thus, negated NAND-gate 124 controls the enable (G) input of transceiver 122 when a data transfer to or from the main processing unit 12 at any address other than the dedicated 32K CRTRAM space.

Finally, in FIG. 7 a parity check circuit known to those skilled in the art is provided for checking data integrity. Construction of parity checking circuits is known to those skilled in the art, and will not be described further herein. In the preferred embodiment, a memory parity error generates an interrupt to the main processing unit 12, which is handled by the main processing unit operating system.

Map Memory

FIG. 8 illustrates the map memory 51 and address multiplexers 50 of the MMU 14 (FIG. 2). It will be recalled from the discussion above that both the main processing unit 12 and the second processing unit 20 can access the primary memory 15 through the map 51. It will be further recalled that the map selects pages of 512 bytes with address lines 52 designated as PAGE0-PAGE9. It will also be recalled that the second processing unit is operative to use the map memory (that is, access the primary memory through the map), as well as access the map to alter the contents thereof to maintain map entries. Accordingly, the second processing unit accesses the map memory 15 in two different manners.

Multiplexers 50 select between page addresses from the main processing unit (address lines 88A9-88A19), and addresses provided from the second processing unit (Z9-Z19). For selection between the main processing unit addresses and the second processing unit address, multiplexers 131, 132, and 133 are employed. The A inputs receive address lines Z9-Z19 from the second processing unit, while the B inputs receive lines 88A-9-88A19. The outputs of multiplexers 131, 132, 133 are connected to the address lines A0-A11 of the map memories 51. Selection between the main processing unit address information and the second processing unit address information is made with a signal ENZ80AD.

Address information from the second processing unit is provided on lines 130 from the Y outputs of multiplexers 141, 142, 143. Multiplexer 141 selects between address lines Z9-Z12 and Z1-Z4; multiplexer 142 selects between address lines Z13-Z16 and Z5-Z8; and multiplexer 143 selects between address lines Z17-Z19 and Z9-Z11. The signal SELMAP chooses either the addresses Z9-Z19 (the A inputs) to be provided to the map memory for accessing through the map, while address lines Z1-Z11 (the B inputs) are selected when access to the map is desired for correcting or otherwise modifying a map entry under program control from the second processing unit 20.

The map memory 51 in the preferred embodiment comprises a pair of 2K×8 static random access memories 51a, 51b such as a type TMM2018 manufactured by Toshiba America, Inc. One memory circuit 51a is employed for storage of the status bits ACC, WPT, VALID, DIRTY, MAPTYPE, TRASH and page address bits PAGE8, PAGE9. Memory circuit 51b stores page address bits PAGE0-PAGE7. Status signals ACC, WPT, VALID, DIRTY and TRASH correspond to map entry status bits A (accessed), P (write protect), V (valid), W (written) and T (trash), respectively, in FIG. 4. Accordingly, memory 51a may be referred to as the "status" memory, while 51b is the "page" memory (although some page address data is contained in the status memory 51a).

The outputs DQ of the status memory 51a are provided on lines 145 to the inputs of a latch circuit 146, as well as to a bus transceiver 65a, a type 74LS245 bidirectional with three-state outputs in the preferred embodiment. The latch circuit 146 holds the status information in response to the LATCH STATUS signal received from the arbiter circuit (described below). Status information from the status RAM 51a is provided in response to the RDSTATUS signal, and is then stored in the latch 146. The outputs Q of latch 146 are also connected back to the lines 145 so that the latched data can be enabled through the transceiver 65a to the Z80 second processing unit data lines Z80D0-Z80D7. Transceiver 65a allows information from the second processing unit data bus to be provided to the data input/output (DQ) of the status RAM 51a. When the output Q of the latch 146 is to be enabled for reading by the second processing unit, the signal RDSTATUSLATCH enables the output control (OC) of the latch 146 onto the lines 145, where the information can then be read on lines 52 or transferred to the data lines Z80D0-Z80D7.

The map page address memory 51b output lines (DQ), comprising signals PAGE0-PAGE7, are provided as address lines 52, and are also connected to a bus transceiver 65b, so that the information can be enabled onto the data lines Z80D0-Z80D7. The direction of data flow for transceivers 65a, 65b is controlled by the signal MRD, which determines whether data is to be read or written onto the data lines of the Z80.

Writing of information to the status RAM 51a occurs in the following manner. A negated NOR-gate 150 is connected to the write (W) input of the status RAM 51a; one input of the gate 150 receives the signal WRSTATUS, while the other input is connected on line 151 to the output of a negated NAND-gate 152. One input of gate 152 is connected to the output of a negated NAND-gate 153, which provides a signal on line 154 during the concurrent presence of the signal MWR, indicating a write command originating at the Z80 and associated circuitry, together with the signal ENZ80CTRL, indicating that the Z80 or second processing unit 20 is in control of the map. The other input to the negated NAND-gate 152 is connected to the Y1 output of a decoder circuit 155, in the preferred embodiment a type 74LS139 manufactured by Texas Instruments. The enable (G) input for decoder 155 is the SELMAP signal, while the A and B inputs are received from address lines Z0 and the signal ENZ80AD, respectively. When the second processing unit 20 places an address on its address lines corresponding to a command to write to the status RAM (addresses 4000-4FFF in FIG. 3A, except Z0=1), a signal will occur on line 151 causing a "write" to the status RAM 51a. It will thus be appreciated that the Z80 under its program control can modify or alter the data contained in the map.

The page RAM 51b is written in a similar manner. A signal on line 154 from the negated NAND-gate 153, together with a signal on line 156 from the Y0 output of decoder 155 (when Z0=0) causes a write pulse to be provided from negated NAND-gate 157 to the write (W) input of page RAM 51b. Because of inverter 158, the input of which is connected to gate 157 and the output of which is connected to the read (R) input of the RAM 51b, the memory is enabled to read at all times it is not specifically instructed to write.

It will now be appreciated that FIG. 8 illustrates means whereby the second processing unit 20 may either access the map memory 51 for purposes of altering or modifying map entries, or may access the map memory through predefined addresses in its address space for translation of such addresses into physical page addresses in the primary memory 15. It will also be appreciated that the circuitry shown in FIG. 8 is responsive to addresses from the main processing unit 12 to cause an address translation to pages in the primary memory as well as status information regarding a particular page, for implementation of a virtual memory system.

It will also be noted in connection with FIG. 8 that there is provided circuitry for indicating whether an accessed page has been "accessed" or is "dirty". Provided for this purpose are bus buffers 160, 161, which provide the signals ACC and DIRTY, respectively, in response to the signal RDSTATUSLATCH. The preferred bus buffers are type 74LS367 three-state bus drivers, manufactured by Texas Instruments. The input to bus buffer 160 for the ACC signal is connected to the output of an OR-gate 162, one input of which is connected to the signal ENZ80AD, while the other input is connected to the latched ACC output signal received from latch 146 on line 163. It should be understood that each address provided by the main processing unit 12 causes the provision from the map memory 51 of the appropriate status and page map entry corresponding to the provided address; it will therefore be appreciated that the signals ENZ80AD will be high (false) for any map accesses which occur in response to provision of an address by the main processing unit. Accordingly, the ACC signal from the output of bus buffer 160 occurs either in response to an indication on line 163 from latch 146 that the addressed page has already been "accessed", or in response to an access from the main processing unit.

Similarly, a given page will be considered "dirty" either in response to a stored indication that the page was already "dirty", by virtue of a signal appearing from the latched output on line 165 from latch 146, or a WE (write enable) signal being provided to indicate that the primary memory has been enabled for a memory write by the main processing unit 12.

Arbiter

Figure 10:
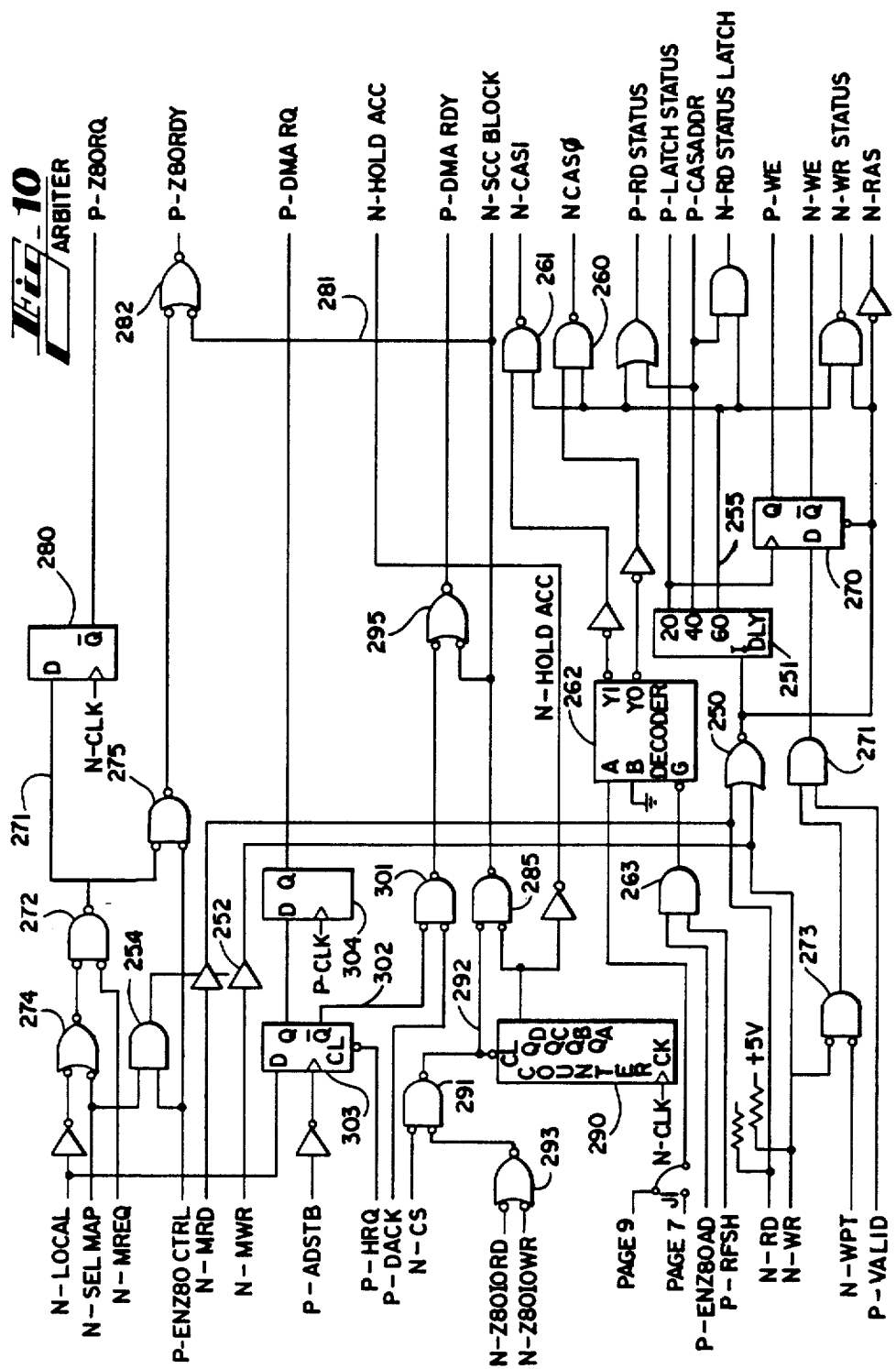

FIGS. 9 and 10 illustrate the arbiter, the circuitry which determines whether the main processing unit 12, the second processing unit 20, or the DMA 55 has access to the primary memory. Particular reference is made to Table I for signal identification and clarification.

Those skilled in the art will understand that most stored program computers treat data and instructions as interchangeable; consequently, such computers will generally operate with a "memory cycle", wherein the computer fetches data (or instructions) from an addressable memory, and may also have other "execution" or "instruction" cycles, wherein preveiously-fetched data (or instructions) are operated on or with. By way of definition, the term "machine cycle" in a computer, as the term is used herein, shall mean any operating cycle of a computer which includes at least one address cycle involving a memory fetch, and may also include one or more other cycles such as an execution cycle. It will therefore be understood that the present invention is operative with any type of computer wherein address information is provided from the computer to a memory for an instruction or data fetch operation, where the requested instruction or other data is provided in response thereto.

In the preferred embodiment, therefore, it will be understood that the 8088 main processing unit 12, as well as the Z80 second processing unit 20, retrieve both data and instructions from an addressable memory by conducting an address cycle wherein the address of data (or of an instruction) to be fetched is placed on the applicable address bus, certain control signals are asserted, and data provided from the memory on the applicable data bus in response thereto. In the 8088 microcomputer, the input READY, which is connected to the line 88RDY, is the acknowledgement from the addressed memory (or other input/output device) that the data transfer is about to be completed by placement of the requested data on the data lines 88D0-88D7. Accordingly, it will be appreciated that the 8088 main processing unit is prevented from completing its memory cycle, as above defined, until completion of the data transfer from memory. It will also be appreciated that the main processing unit is temporarily halted until the 88RDY signal signifies that the requested data is about to be provided in response to a memory request. Those skilled in the art will understand that a similar mechanism is employed in the Z80 second processing unit 20, which employs the signal MREQ to signify a memory request, and the signal Z80RDY, which is connected to the WAIT input to temporarily halt the Z80 from further operation until the memory (in actuality, the arbiter 54) responds with the requested data.

Referring first to FIG. 9, the signal BUSRAM is the primary signal from the 8088 main processing unit 12 to indicate that an access to the primary memory 1 is requested. The basic signal indicating which of the various processing entities has control of the memory is the ENZ80CTRL signal. Flip-flops 201 and 202, which are clocked at opposite edges of the system clock, provide outputs ENZ80AD and ENZ80CTRL to indicate that the second processing unit 20 has control, flip-flops 203, 204 provide the DMA acknowledge signal DACK to indicate DMA control, while flip-flop 205 provides the signal EN88CTRL as an indication that the main processing unit 12 has control.

It should be noted at this juncture that whenever the main processing unit attempts to address a page which is not valid (i.e., not currently resident in the primary memory), the main processing unit is made "not ready" with signal 88RDY; in essence, the main processing unit is halted mid-cycle while the page fault condition is corrected. The fact of a page fault condition is passed to the second processing unit 20 by means of the signal TRAP, which ultimately results in an interrupt to the second processing unit.

The mechanism for allowing control to the 8088 main processing unit is as follows. The signal BUSRAM is made low (true), which together with a low or "no trap" condition on line 210 (the TRAP signal is false) causes a low on line 211 from negated NAND-gate 212. A low on line 211 ensures that a 0 will be clocked into flip-flop 201 from AND-gate 215, so that the ENZ80CTRL signal is low, a necessary precondition for allowing control to the main processing unit. On the other hand, a memory request from the Z80 second processing unit with signal Z80RQ, or a DMA request signal DREQ will cause a "1" to appear on line 214 from OR-gate 217, thereby enabling AND-gate 215 in the event line 211 is high.

It will be noted that the concurrent presence of the MWR signal and the SCCBLOCK signal at negated NAND-gate 218 prevents the DREQ signal from propagating through AND-gate 216. The SCCBLOCK signal occurs when the serial communications controller G2 (FIG. 11) is actively "blocking" other transfers through DMA activity.

The 8088 main processing unit 12 is allowed to execute its instructions only when its ready line 88RDY is high. This signal is provided as an output of negated NAND-gate 220. When BUSRAM goes low, indicating a request, and negated NOR-gate 223 passes either a low on line 221 (a "trap" condition) or a low on line 222 (indicating an acknowledge signal is about to occur on the DACK signal), the signal 88RDY will go low, making the 8088 "not ready". The removal of the BUSRAM signal, the trap condition, or the DACK signal will make the 88RDY signal true again, enabling the 8088 once again for execution of instructions.

The signal EN88CTRL, from the output of flip-flop 205, allows read and write signals from the main processing unit, 88MRD and 88MWR, to pass through bus drivers 228 as the signals RD and WR to read or write the primary memory under the following conditions. The D input of flip-flop 205 is connected to the output of a three-input AND-gate 225. One input to the gate 225 is connected on line 226 to the signal ENZ80AD, preventing any output whenever the second processing unit is enabled. Another input to AND-gate 225 is connected on line 227 to the output of a negated AND-gate 230. This signal goes high on the concurrent presence of BUSRAM and either a memory read or write from the main processing unit, 88MRD or 88MWR, through negated NOR-gate 234. The final input to AND-gate 225 is connected on line 231 to the output of a NOR-gate 232. If the VALID signal is high, indicating that the map entry for a requested page is "not valid" or not in memory, then line 231 will be low, preventing a "1" from being clocked into flip-flop 205 to enable the 8088 to be in control via the signal EN88CTRL.

A "trap" condition occurs whenever a read or write command is provided from the 8088 main processing unit 12, and a requested page is "not valid" as indicated by the map entry for the requested page. The TRAP signal, which signifies a page fault condition, occurs under the following conditions. A D-type flip-flop 235 clocks in the output of an AND-gate 236, which has three inputs. One input is connected to line 226, which will be low whenever the Z80 second processing unit is in control. Another input to gate 236 is connected on line 237 to the output of OR-gate 240, which provides a signal whenever a page is "not valid" or whenever the MAPTYPE and SELTYPE signals are not equal, as determined by exclusive OR-gate 233. The final input to gate 236 is connected to line 227, which is high during the concurrent present of BUSRAM and either a memory or write from the 8088.

The TRAP signal primarily occurs when a page which is not resident in memory is requested by the main processing unit, and foremost amongst its effects is to make the 88RDY signal low, temporarily disabling the main processing unit until the requested page can be accessed over the network from the secondary memory. However, the MAPTYPE and SELTYPE signals comprise means for allowing operation of the main processing unit in a second 1 megabyte virtual address space. The MAPTYPE signal, a status bit in the map entry, signifies which of the two virtual address spaces the particular map entry represents. The signal SELTYPE is provided by the second processing unit to signify which of the two virtual address spaces is selected for a primary memory operation. When these two signals are not equal, as determined by exclusive OR-gate 233, a "1" will pass through OR-gate 240 and AND-gate to cause a trap, and a "0" will pass through NOR-gate 232 to disable AND-gate 225, and make EN99CTRL false. Thus, switching between virtual address spaces is effectuated by generating a page fault.

FIG. 10 illustrates circuitry in the arbiter 54 for generating read and write signals for the primary memory, and for directing appropriate control signals to either the main processing unit 12, second processing unit 20, or DMA 55, as appropriate. In addition, FIG. 10 includes circuitry for causing the map memory to access map entries in response to attempts by the processors to access the primary memory.

One of the principal functions of the circuitry in FIG. 10 is to provide appropriate column address strobes (CAS) and row address strobes (RAS) for the primary memory. The signals MRD and MWR which originate either from the Z80 second CPU 20 or the DMA in FIG. 6, when enabled through three-state buffers 252, are wire-ORed with the signals RD and WR, respectively. The RD and WR signals are provided to the inputs of a NOR-gate 250, the output of which is connected to the input (I) of a delay circuit (DLY) 251. Buffers 252 are controlled by AND-gate 254, which enables the MRD or MWR signals during the concurrent presence of the SELMAP signal and the ENZ80CTRL signal, indicating that the map has been selected and that the Z80 is in control. The RD or WR signals occur when the signals 88MRD or 88WWR (FIG. 9) are enabled by the output EN88CTRL from flip-flop 205. Read or write pulses from the output of NOR-gate 250 are delayed for twenty, forty, and sixty nanoseconds (nS) for various purposes. A twenty nS delay provides the signal LATCHSTATUS, while a forty nS delay provides column address select signal CASADDR, while a sixty nS delay is used to form a number of other signals shown in FIG. 10.

The column address strobes CAS0 and CAS1 are generated by NAND-gates 260, 261, respectively. Each of these NAND-gates has as one input the sixty nS delayed read or write pulse on line 255. A decoder circuit 262 is employed to select between two 256K banks of main memory. For the 512K embodiment, the signal PAGE9 selects between two 256K banks, while for a 128K embodiment, the signal PAGE7 selects between two banks. A jumper J1 allows selection between PAGE9 or PAGE7.

The decoder outputs Y0, Y1, which are inverted and then provided to the inputs of NAND-gates 260, 261, are enabled when the enable input (G) is low. This input will be low as a function of AND-gate 263. The enable (G) input will be low at all times except during the concurrent presence of ENZ80AD, indicating the Z80 is in control of the primary memory, and the signal denominated RFSH, which occurs during a refresh cycle. As described above in connection with FIG. 7, signals for generating refresh pulses are known to those skilled in the art, and it will be understood that such a refresh signal is periodically provided in the disclosed embodiment as the signal RFSH for periodic refresh of the primary memory.

The WE (write enable) signal for the primary memory 15 is provided from the Q output of a D-type flip-flop 270. The D input is connected to the output of an AND-gate 271, which provides a "1" only if the accessed page is in memory as indicated by the VALID signal, and if a write is being attempted (as manifested by the signal WR) and the selected page is not write protected (as indicated by the signal WPT) through negated AND-gate 273. The write enable or WE signal will be false and prevent writing to the primary memory unless the page is both valid and not write protected.

Still referring to FIG. 10, there is provided circuitry for indicating the origination of a request by the Z80 or second processing unit 20 for control of the primary memory, as indicated by the signal Z80RQ. This signal is provided from the output of a D-type flip-flop 280 upon the following conditions. The D input is connected on line 271 to the output of a negated NAND-gate 272. One input to gate 272 receives the signal MREQ, which originates on FIG. 6 from the Z80 or second processor 20. The other input is connected to the output of a negated NOR-gate 274, which provides a low (true) signal when a memory access which is "not local" (that is, within the 32K window into the primary memory), as indicated by the LOCAL signal, or when the map has been selected for an operation, as indicated by the SELMAP signal.

The "ready" line to the Z80 or second processing unit 20, the Z80RDY signal, is provided by the output of a negated NOR-gate 282. This signal occurs from negated NAND-gate 275 whenever the Z80 has been given control, as indicated by the ENZ80CTRL signal, together with an output from negated NAND-gate 272. It will be appreciated that when the Z80 has not been given control of the primary memory, the ENZ80CTRL signal will be low, and make the Z80RDY signal low, preventing any program execution by the second processing unit 20.

Alternatively, the SCCBLOCK signal, provided on line 281 to the remaining input of negated NOR-gate 282, makes the second processing unit 20 not ready. The SCCBLOCK signal is the output of a negated NAND-gate 285. This signal primarily indicates that the serial communications controller or SCC 62 (FIG. 11) is performing a DMA transfer, and is "blocking" access from other processing units. The inputs to gate 285 are provided from the outputs of a binary counter 290, and another negated NAND-gate 291. Counter 290 counts a number (eight in the disclosed embodiment) of clock pulses, periodically providing the signal HOLDACC to "hold access" for the SCC. The signal HOLDACC is required because the serial communications controller 62 is only capable of data transfers at a relatively slow rate. The signal CS, which indicates that the SCC has been selected, together with either Z80IORD or Z80IOWR from negated NOR-gate 293, causes a low to appear on line 292 to one input of negated NAND-gate 285. Thus, when the serial communications controller 62 is enabled for data transfers, the CS signal will be low (true), and cause the provision of the SCCBLOCK signal.

The DMARDY signal, which passes control of the primary memory 15 to the DMA 55, appears at the output of a negated NOR-gate 295. When either of the inputs to this gate are low, the DMA will be "not ready" and disabled from operation. One of the inputs to gate 295 is the SCCBLOCK signal, which goes low to indicate that the serial communications controller 62 is performing or setting up for a data transfer.

The other input to DMARDY gate 295 is received from an output of negated NAND-gate 301. One input to gate 301 is connected to the DMA acknowledge signal DACK which is provided when DMA circuit 55 (FIG. 6) grants permission to SCC 62 to perform a DMA cycle. The other input of gate 301 is connected on line 302 to a D-type flip-flop 303. The ADSTB signal from DMA 55 clocks a "1" (the LOCAL signal being false) into flip-flop 303, and makes line 302 low whenever a DMA data transfer in the upper 32K of the Z80 address space occurs. An output from flip-flop 303 can only occur when the HRQ signal is high, which is connected to the clear (CL) input of the flip-flop; HRQ is high only during DMA cycles. Accordingly, a low on line 302 together with DACK makes the DMARDY signal low, thus making the DMA not ready for a data transfer. The "1" clocked into flip-flop 303 is passed to flip-flop 304, and becomes the DMA request signal DMARQ on the next clock cycle.

Network Interface

FIG. 11 illustrates the network interface circuitry including the serial communications controller (SCC) 62 and network interface 63. In the preferred embodiment, SCC 62 is a type 82530 serial communications controller manufactured by Intel Corporation. The preferred SCC includes two independent full duplex serial channels, and is capable of connecting to high-speed communications lines using various types of communications protocols in polled, interrupt-driven or DMA driven modes of operation. In the disclosed embodiment, the SCC 62 is operated in the DMA mode for transfer of pages of data from the network link 25 directly into the primary memory 15 over data lines Z80D0–Z80D7.

The SCC 62 is enabled through negated NOR-gate 310, the output of which is connected to the "chip select" or CS input; either of the signals SELCOM or DACK selects the SCC for a read or write operation through gate 310. A "read" occurs during the concurrent presence of the signal Z80IORD and HOLDACC through negated NAND-gate 312, while a "write" occurs during the concurrent presence of Z80IOWR and HOLDACC through negated NAND-gate 313. The DATA lines of the SCC 62 are connected to the second processor data lines Z80D0–Z80D7. The least significant bit Z0 of the second processor address bus is used to select the SCC for a data transfer or for receipt of a command, by connection to the data/command (D/C) input through negated OR-gate 305.

The transmit/receive communications outputs $T_xDA$ of the SCC 62 are connected in a manner known to those skilled in the art to network interface circuitry 63, for connection of the SCC to the network link 25. Such network connections will be known to those skilled in the art, and will not be described further herein.

It should be noted that the preferred communications controller circuit employed in the disclosed embodiment possesses both interrupt capability and DMA capability. It will therefore be appreciated that the interrupt output (INT) provides the signal INT to cause an interrupt of the Z80 or second processing unit 20 (FIG. 6), in the event that the SCC 62 requires servicing. Additionally, it will be understood that the request (REQ) output of the SCC 62 provides the DMA request signal DREQ when the SCC has been conditioned to operate in the DMA mode and transfer data directly between the primary memory and the network.

It will finally be noted in connection with FIG. 11 that the TRAP signal is connected to one of the "clear-to-send" (CTS) inputs. In the disclosed embodiment, this connection is made for the purpose of generating an interrupt to the second processing unit 20 whenever a "trap" occurs, which indicates a page fault condition. Thus, the SCC circuit 62 is used to generate this interrupt, a function which is not directly related to the communications functions of the SCC 62.

Operation

FIG. 12 is flow chart diagram which illustrates a sequence of steps which may be embodied as a program for the second processing unit 20. Those skilled in the art will understand and appreciate that the improved virtual memory computer system disclosed herein may be constructed by circuits comprising digital hardware, or by a preferred embodiment, as disclosed herein, using a programmed microcomputer as a second processing unit, together with supporting peripheral circuits. It will be understood that the operation disclosed herein is merely illustrative and that the functional equivalents of the second processing unit or microcomputer 20 may include other devices including digital hardware, firmware, or software, which are capable of performing the described functions and sequences in the virtual memory computer system. It will be further appreciated that the microcomputer 20 may be programmed to perform the steps outlined in FIG. 12.

The operational flow begins at the START block 400. It will be recalled from the discussion above that a page fault condition causes the generation of an interrupt to the microcomputer 20; in addition, an interrupt is generated in response to the depression of a key on the keyboard 38 (FIG. 2), to ensure that no keystrokes are lost if the main processing unit is temporarily halted while a page fault condition is being corrected. It will thus be understood that in the preferred embodiment there is also provided means (not illustrated) for generating an interrupt to the second processing unit 20 upon the depression of a key on the keyboard, which causes the second processing unit to determine whether the 8088 main processing unit is in an operational state which allows it to take the data from the keyboard. Thus, it should be understood that the sequence of steps illustrated in FIG. 12 is preferably embodied as an interrupt routine for the second processing unit.

At step 401, therefore, the second processing unit 20 executes a sequence of instructions to determine the cause of the interrupt, and to respond to the condition that generated the interrupt. At step 401, the inquiry is made whether a key of the keyboard 38 was depressed. If so, at 402 the second processing unit examines the status of the main processing unit to determine whether the 8088 can take the data representative of the particular key depressed. If the 8088 is not ready due to the second processing unit making the signal 88RDY not true, as when a page fault condition is being handled, then at 403 the data is stored in a memory location accessible by the second processing unit.

When the second processing unit determines that the 8088 can take the keyboard data, the YES branch from 402 is taken to 404, and the second processing unit retrieves buffered keyboard data from memory, provides it over the Z80 address and data lines 21 through the keyboard buffer 39 to the PIO 32, which then allows the 8088 to take the keyboard data.

In the event that the actuation of a key was not the cause of the interrupt to the second processing unit, the NO branch from 401 is taken to 407, where the second processing unit inquires whether a page fault condition exists. As discussed above, this is accomplished in the preferred embodiment by examining the map entry corresponding to the address provided by the main processing unit. If a page fault condition does not exist, the NO branch from 407 is taken to 408, and the second processing unit enters a sequence of steps for memory management. In the preferred embodiment, all pages currently resident in the primary memory 15 are periodically examined by examining the corresponding status words in the map 51 to determine frequency of use. Pages more frequently accessed by the main processing unit tend to remain resident in the primary memory, while pages which are less frequently accessed tend to be swapped out or overwritten as new pages are needed. This is accomplished in the preferred embodiment by a linked list data structure which is maintained by the second processing unit. The second processing unit periodically traverses the linked list by sequentially examining the map entries, and repositions pages in the list according to whether or not the pages have been accessed since the last examination.

Accordingly, at step 408, the second processing unit examines the next page in the linked list, and at 409, examines the "accessed" status bit to determine whether the page being examined has been accessed by the main processing unit since the last examination.

In the event that the examined page has been accessed, the program branches to 412, where the second processing unit moves the page to the front of the linked list. In the event that the page was not accessed, the NO branch from 409 is taken, and the program returns. It will be appreciated that pages which are frequently accessed tend to migrate toward the front of the linked list, while pages which are infrequently accessed migrate toward the end of the list. The end of the list is the "deletion candidate", a page which is overwritten when the need arises to store a new page in the primary memory to correct a page fault condition.

Returning to step 407, in the event that a page fault condition occurs, the YES branch from 407 is taken to 415, where steps to correct the page fault condition are taken. The first taken is to examine the output address being provided by the main processing unit so that the non-resident page can be requested over the network. Then, at 416, steps are taken to set up for storage of the new incoming page. This entails examining the end of the linked list of pages referred to above, to obtain the candidate for deletion or overwriting. The map entry for the page at the end of the list is examined. At 418, the "trash" bit is first examined to determine whether the deletion candidate is considered expendable without first saving the page. For example, if the deletion candidate page represents a portion of an application program for the main processing unit which is permanently stored on disk, there is no need to save the page since the program is disk-resident. If the page is "trash", then the YES branch is taken to 422, and the incoming new page is read in over the deletion candidate.

In the event that the deletion candidate is not trash, then the NO branch from 418 is taken to 420, and the "dirty" or "written" bit W is examined to determine whether the deletion candidate page had been modified by the main processing unit during execution of an application program and should therefore be saved on disk. If the page has in fact been modified, then the YES branch from 420 is taken to 421, where the deletion candidate page is written out over the network to disk. Then, the program proceeds to 422, where the new page is read in.

After the new page has been read in, at step 425 the fault condition is cleared by making the "valid" status bit true to indicate that the requested page is now resident in memory. The main processing unit is then released to continue operation, and the primary memory responds to the memory access by providing data in the requested to the main processing unit. Then, the program returns.

Finally, it will be understood that the foregoing has been a description of the structure and operation of the preferred embodiment of the present invention of an improved virtual memory computer system. It will be appreciated that other alternative functions and sequences of operation of a virtual memory computer system may be performed by the structure described herein, while still remaining within the scope of the present invention. It will be appreciated by those skilled in the art that the apparatus of the present invention may be arranged so that the functional operation of the system can be readily modified by changing certain circuit connections or by changing the program sequence of operation of the second processing unit 20, without materially affecting the operation of the main processing unit in the execution of its applications programs. Thus, it will be appreciated that the foregoing description has been merely illustrative, and that the present invention is limited solely by the appended claims.

We claim:

1. An improved main processing unit operating system independent virtual memory computer system, comprising:
    memory means having an $2^n$ word actual address space for storage of instructions and data for producing by said computer system;
    a main processing unit operative to provided a fetching address within an $2^m$ word virtual address space, where m is greater than n, for fetching instructions or data from said memory means and to execute a set of first instructions for processing data in said computer system and for running operating system software; and
    a secondary processing unit responsive to said fetching address provided by said main processing unit for executing virtual memory management software, said virtual memory management software comprising a set of second instruction executable independently of said set of first instructions and operative for providing instructions or data to said memory means for accessing by said main processing unit from an actual address in said memory means corresponding to said fetching address, said set of second instructions being executable only on said secondary processing unit,
    said main processing unit being operative to process data and execute user application or operating system instructions within said virtual address space without executing any of said first instructions for implementing or maintaining virtual memory and said secondary processing unit being incapable of executing any of said first instructions.

2. The improved virtual memory computer system of claim 1, further comprising memory map means for translating said fetching address to an address in said actual address space.

3. The improved virtual memory computer system of claim 1, wherein said memory means is a primary addressable memory, and further comprising:
    a secondary addressable memory; and
    wherein said secondary processing unit retrieves instructions or data from said secondary addressable memory and stores said retrieved instructions or data in said primary addressable memory at an actual address in said actual address space corresponding to said fetching address.

4. The improved virtual memory system of claim 1, wherein said memory means is a primary memory means, and further comprising:
    page fault detecting means responsive to said fetching address provided by said main processing unit for detecting the occurrence of a page fault condition, said page fault condition occurring if said fetching address corresponds to data requested by said main processing unit not currently resident in said primary memory means, and
    wherein said secondary processing unit is responsive to the detection of said page fault condition by said page fault detecting means for retrieving said requested data from a second memory means corresponding to said fetching address and for storing said requested data in said primary memory for accessing by said main processing unit.

5. The improved virtual memory computer system of claim 4, wherein said primary means is operative to provide said data or instructions to said main processing unit in response to said fetching address,
    wherein in response to a page fault condition said secondary processing unit retrieves said requested data or instructions from said second memory and stores said requested data or instructions in said primary memory means responding to said fetching address
    whereafter said primary memory means provides said requested data or instructions to said main processing unit in response to said fetching address.

6. The improved virtual memory computer system of claim 4, wherein said main processing unit has a plurality of operating cycles including an address cycle wherein said fetching address is provided to said primary memory and an instruction cycle for executing a previously-fetched instruction,
    wherein said secondary processing unit suspends said address cycle in response to said page fault condition, and
    wherein said secondary processing unit retrieves said requested data or instructions from said second memory means and stores said requested data or instructions in said primary memory means, and then allows completion of said address cycle.

7. The improved virtual memory computer system of claim 6, further comprising means responsive to the detection of said page fault condition for temporarily halting the execution of operating cycles of said main processing unit until correction of said page fault condition.

8. An improved main processing unit operating system independent virtual memory computer system, comprising:
    memory means having an n word actual address space for storage of instructions and data for processing by said computer system;
    a main processing unit operative to provide a fetching address within an m word virtual address space, where m is greater than n, for fetching instructions or data from said memory means and to execute a set of first instructions for processing data in said computer system and for running operating system software without virtual memory capability; and
    virtual memory management means operative independently of said main processing unit and said operating system software in response to said fetching address provided by said main processing unit for temporarily halting operation of said main processing unit, for providing instructions or data to said memory means for accessing by said main processing unit from an actual address in said memory means corresponding to said fetching address, and for subsequently allowing said main processing unit to continue operation, said main processing unit being operative to process data and execute instructions within said virtual address space independently of the operation of said virtual memory management means without execution of any programs or overhead processing by said main processing unit for virtual memory.

9. An improved virtual memory computer system, comprising:

a primary addressable memory having a p-bit primary memory address space corresponding to a predetermined first number $2p$ of physical addressable locations, where p is an integer;

a secondary addressable memory;

a third addressable memory;

a main processing unit having n address lines, where n is an integer, and capable of addressing a first processor address space corresponding to $2^n$ words of memory;

means defining a second address space having m address lines, where m is an integer, and capable of addressing $2^m$ words of memory, said second address space comprising a first portion and a second portion;

memory map means for translating input addresses in said first processor address space and said second portion of said second address space to addresses in said primary memory address space; and means for retrieving a page of digital data from said secondary addressable memory and for storing said retrieved page at addresses corresponding to said second addresses corresponding to said second address space, said page retrieving means being responsive to generate addresses in said second address space such that a first page portion of said retrieved page is stored in said third addressable memory at addressable locations corresponding to said first portion of said second address space and a second page portion of said retrieved page is stored in said primary addressable memory at addressable locations corresponding to said second portion of said second address space for accessing by said main processing unit.

10. The improved virtual memory computer system of claim 9 wherein said third addressable memory has a third memory address space, and wherein said first portion of said second address space corresponds to a plurality of addressable locations in said third addressable memory and said second portion of said second address space corresponds to a plurality of locations in said primary addressable memory, whereby said first page portion of a retrieved page is stored in said third addressable memory.

11. The improved virtual memory computer system of claim 9, wherein said first page portion of said retrieved page comprises a header portion and said second page portion of said retrieved page comprises instructions or data for said main processing unit.

12. The improved virtual memory computer system of claim 9, wherein said page retrieving means comprises direct memory access (DMA) means responsive to automatically generate said addresses in said second address space when a page of digital data is retrieved by said page retrieving means.

13. The improved virtual memory computer system of claim 9, wherein m is greater than p.

14. The improved virtual memory computer system of claim 9, wherein said means defining a second address space comprises direct memory access (DMA) means responsive to automatically generate said addresses in said second address space for said page retrieving means when a page of digital data is retrieved by said page retrieving means.

15. The improved virtual memory computer system of claim 9, wherein said means defining a second address spaced comprises a second processing unit having m address lines.

16. The improved virtual memory computer system of claim 15, further comprising memory management means responsive to input addresses in said first processor address space and said second portion of said second address space provided to said memory map means for coordinating access to said primary addressable memory between said main processing unit and said second processing unit.

17. The improved virtual memory computer system of claim 15, wherein said second processing unit is operative to modify entries in said memory map means so that said memory map means correctly translates said input addresses to addresses in said primary addressable memory when a page is retrieved by said page retrieving means.

18. The improved virtual memory computer system of claim 15, wherein said memory map means is responsive to translate addresses in predetermined portions of said second address space to addresses in said primary addressable memory.

19. The improved virtual memory computer system of claim 15, wherein said page retrieving means retrieves said page of digital data from said secondary addressable memory in response to signals from said second processing unit.

20. The improved virtual memory computer system of claim 9, wherein said memory map means comprises an addressable memory comprising a plurality of addressable locations for storing a plurality of map entries, each of said map entries comprising an address in said primary memory corresponding to an input address in said first processor address space or an input address in said second portion of said second address space.

21. The improved virtual memory computer system of claim 9, wherein said secondary addressable memory comprises a disk drive.

22. The improved virtual memory computer system of claim 9, further comprising communication means for transmitting said retrieved page of digital data from said secondary addressable memory to said primary addressable memory.

23. The improved virtual memory computer system of claim 22, wherein said communication means comprises a digital serial network communications controller operative to transmit and receive digital data over a serial data link; and network control means operative to transfer said retrieved page from said secondary addressable memory through said serial data link into said primary addressable memory upon command by said page retrieving means.

24. The improved virtual memory computer system of claim 9, wherein said first processor address space is a first first processor address space, and further comprising means defining for said main processing unit a second n-bit first processor address space corresponding to $2^n$ additional words of memory.

25. The improved virtual memory computer system of claim 9 further comprising means for relating a predetermined set of addresses in said second address space corresponding to a predetermined portion of said first processor address space to addresses in said primary addressable memory such that at least a predetermined portion of addresses in said second address space correspond to addresses in said primary addressable memory.

26. An improved virtual memory computer system, comprising:
   a primary addressable memory having a primary memory address space corresponding to a predetermined first number $2^p$ of physical addressable locations, where p is an integer;
   a secondary addressable memory having a predetermined second number of physical addressable locations;
   a main processing unit having an n-bit address field, where n is an integer, and capable of addressing a first processor address space corresponding to $2^n$ words of memory;
   a third addressable memory having a third memory address space corresponding to a predetermined third number of physical addressable locations;
   a second processing unit capable of addressing a second processor address space, said second processor address space comprising a first portion corresponding to addressable locations in said third addressable memory and a a second portion corresponding to addressable locations in another addressable memory;
   memory map means for translating addresses in said first processor address space and said second portion of said second processor address space to addresses in said primary memory address space; and
   direct memory access (DMA) means for retrieving a page of digital data from said secondary addressable memory and for storing a retrieved page at addresable locations in said second processor address space, said retrieved page comprising a header portion and a data portion,
   said DMA means being operative to generate addresses in said second processor address space upon the retrieval of said retrieved page from said secondary addressable memory such that said header portion of said retrieved page is stored at addressable locations corresponding to said first portion of said second processor address space and said data portion of said retrieved page is stored at addressable locations corresponding to said second portion of said second processor address space,
   whereby said header portion is stored in said third addressable memory and said data portion is stored in said primary addressable memory for accessing by said main processing unit through said memory map means.

27. The improved virtual memory computer system of claim 26, further comprising memory management means responsive to input addresses in said first processor address space and said second portion of said second processor address space provided to said memory map means for coordinating access to said primary addressable memory between said main processing unit and said second processing unit.

28. The improved virtual memory computer system of claim 26, where p is less than n.

29. The improved virtual memory compute system of claim 26, further comprising means for relating a predetermined set of addresses in said second processor address space corresponding to a predetermined portion of said first processor address space to addresses in said primary addressable memory, such that at least a predetermined portion of addresses in said second processor address space correspond to addresses in said primary addressable memory.

30. The improved virtual memory computer system of claim 26, wherein said memory map means comprises an addressable memory comprising a plurality of addressable locations for storing a plurality of map entries, each of said map entries comprising an address in said primary addressable memory corresponding to an input address in said first processor address space or an input address in said second portion of said second processor address space.

31. The improved virtual memory computer system of claim 30, wherein said second processing unit is operative to maintain said memory map by modifying said map entries so that said map entries relate to an addressable location in said primary addressable memory at which data corresponding to addresses in said first processor address space and addresses in said second portion of said second processor address space is stored.

32. An improved main processing unit operating system independent virtual memory computer system, comprising:
   a main processing unit having a plurality of operating cycles including an address cycle wherein an address of a primary addressable memory containing data to be retrieved by said main processing unit is provided on an address bus as an output address and data provided to said main processing unit over a data bus in response thereto from said primary addressable memory, and an instruction cycle wherein said main processing unit executes a previously retrieved instruction; and
   virtual memory means operative independently of operating system software for said main processing unit, comprising:
   page fault detecting means responsive to an output address provided on said address bus for detecting the occurrence of a page fault condition, said page fault condition occurring if an output address for a particular address cycle corresponds to data not currently resident in said primary addressable memory;
   page fault correcting means responsive to the occurrence of said page fault condition for suspending said particular address cycle, for retrieving data corresponding to said output address from a secondary addressable memory, for storing retrieved data corresponding to said output address in said primary addressable memory, and for thereafter allowing said main processing unit to compete said particular address cycle and begin a subsequent operating cycle.

33. The improved virtual memory computer system of claim 32, wherein said virtual memory means is responsive to the absence of a page fault condition for providing data on said data bus from an addressable location in said primary addressable memory corresponding to said output address.

34. The improved virtual memory computer system of claim 32, wherein said page fault detecting means comprises memory map means including an addressable memory having a plurality of addressable locations for storing a plurality of map entries, each of said map entries containing data indicative of whether said output address from said main processing unit corresponds to data present in said primary addressable memory.

35. The improved virtual memory computer system of claim 32, wherein said page fault correcting means comprises a second processing unit operating independently of said main processing unit.

36. A computer system, comprising:
a first processing unit having n address lines, wherein n is an integer, and capable of addressing a first processor address space corresponding to $2^n$ words of memory;
a second processing unit having m address lines, where m is an integer and capable of addressing a second processor address space corresponding to $2^m$ words of memory;
a primary addressable memory having p address lines, where p is an integer, and defining a primary memory address space corresponding to a predetermined number $2^p$ of physical locations for storing data, said primary addressable memory being accessible by said first and said second processing units; and
memory map means for translating addresses in said first processor address space and said second processor address space to addresses in said primary memory address space by providing a plurality of map entries, each of said map entries relating an address in said first or said second processor address space to an address in said primary memory address space, said first processor address space including a predetermined portion which does not correspond to addresses in said primary memory address space,
said memory map including a plurality of map entries which relate a predetermined set of addresses in said second processor address space corresponding to said predetermined portion of said first processor address space to addresses in said primary addressable memory,
so that map entries corresponding to said predetermined portion of said first processor address space are made available for use by said second processing unit.

37. The computer system of claim 36, wherein said predetermined portion of said first processor address space is not used by said first processing unit so that map entries which would otherwise be available for use by said first processing unit are used by said second processing unit are used by said second processing unit.

38. The computer system of claim 36, wherein said first and said second processing units access said primary memory over a common data transfer means, and further comprising processor arbiter means responsive to a request from one of said first or said second processing units for seizing said data transfer means for a data transfer to or from said primary addressable memory.

39. The computer system of claim 36, wherein said predetermined portion of said first processor address space corresponds to addresses in an auxiliary addressable memory accessable only by said first processing unit.

40. A virtual memory multi-processor computer system, comprising:
a primary addresable memory having p address lines corresponding to a primary memory address space corresponding to a predetermined first number $2p$ of physical addressable locations, where p is an integer, and having a primary memory data bus;
a first processing unit having n address lines and capable of addressing a first processor address space corresponding to $2^n$ words of memory, where n is an integer,
said first processing unit having a plurality of operating cycles including an address cycle wherein an address of said primary addressable memory to be accessed for a memory operation is provided on a first address bus as an output address together with a memory request signal, and data provided from or to said first processing unit over a first data bus in response thereto from or to said primary addressable memory, and an instruction cycle wherein said first processing unit executes a previously-retrieved instruction;
a second processing unit having m address lines, where m is an integer, and capable of addressing a second processor address space corresponding to $2^m$ words of memory,
said second processing unit having a plurality of operating cycles including an address cycle wherein an address of said primary addressable memory to be accessed memory to be accessed for a memory operation is provided on a second address bus as an output address together with a memory request signal, and data provided from or to said second processing unit over a second data bus in response thereto from or to said primary addressable memory, and an instruction cycle wherein said second processing unit executes a previously-retrieved instruction;
arbiter means responsive to said memory request signal from a requesting processing unit, said requesting processing unit comprising the particular one of said first or said second processing units first providing said memory request signal, for enabling said requesting processing unit to access said primary addressable memory for said memory operation and for temporarily disabling the nonrequesting one of said first or said second processing units from completing its respective said address cycle until said requesting processing unit has completed said memory operation;
address validity detecting means for detecting when an address provided to said primary addressable memory from at least one of said processing units corresponds to data currently resident in said primary addressable memory and for providing a page valid signal in response thereto;
trap means responsive to the absence of said page valid signal for temporarily halting said at least one of said processing units from completing its said address cycle and for providing a trap signal to the other one of said processing units, said other processing unit being responsive to said trap signal to retrieve data from a secondary addressable memory corresponding to said address from said at least one of said processing units and to place said data in said primary addressable memory; and address and data multiplexing means for multiplexing said first and said second address buses to said primary addressable memory address lines, and said first and said second data buses to said primary addressable memory data bus.

41. The multi-processor computer system of claim 40, further comprising address translation means connected to the output of said address multiplying means for translating addresses on said first and said second address buses into addresses of said primary addressable memory.

42. The multi-processor computer system of claim 40, wherein p is less than n or m, and said address translation means comprises virtual memory means.

43. An improved main processing unit operating system independent virtual memory computer system, comprising:

primary memory means having an $2^n$ word actual address space for storage of instructions and data for processing by said computer system;

a main processing unit operative to provide a fetching address within an $2^m$ word virtual address space, where m is greater than n, for fetching instructions or data from said memory means and to execute a set of first instructions for processing data in said computer system and for running operating system software, said main processing unit being operative to process data and execute user application or operating system instructions within said virtual address space without executing any of said first instructions for implementing or maintaining virtual memory;

a secondary processing unit responsive to said fetching address provided by said main processing unit for executing a set of second instructions independently of said set of first instructions for providing instructions or data to said memory means for accessing by said main processing unit from an actual address in said memory means corresponding to said fetching address;

page fault detecting means responsive to said fetching address provided by said main processing unit for detecting the occurrence of a page fault condition, said page fault condition occurring if said fetching address corresponds to data requested by said main processing unit not currently resident in said primary memory means;

said secondary processing unit being responsive to the detection of said page fault condition by said page fault detecting means for retrieving said requested data from a second memory means corresponding to said fetching address and for storing said requested data in said primary memory means for accessing by said main processing unit;

said primary memory means being operative to provide said data or instructions to said main processing unit in response to said fetching address;

said secondary processing unit being operative in response to a page fault condition to retrieve said requested data or instructions from said second memory means and store said requested data or instructions in said primary memory means prior to said primary memory means responding to said fetching address, whereafter said primary memory means provides said requested data or instructions to said main processing unit in response to said fetching address.

44. An improved main processing unit operating system independent virtual memory computer system, comprising:

primary memory means having an $2^n$ word actual address space for storage of instructions and data for processing by said computer system;

a main processing unit operative to provide a fetching address within an $2^m$ word virtual address space, where m is grater than n, for fetching instructions or data from said memory means and to execute a set of first instructions for processing data in said computer system and for running operating system software, said main processing unit being operative to process data and execute user application or operating system instructions within said virtual address space without executing any of said first instructions for implementing or maintaining virtual memory, said main processing unit having a plurality of operating cycles including an address cycle wherein said fetching address is provided to said primary memory and an instruction cycle for executing a previously-fetched instruction;

page fault detecting means responsive to said fetching address provided by said main processing unit for detecting the occurrence of a page fault condition, said page fault condition occurring if said fetching address corresponds to data requested by said main processing unit not currently resident in said primary memory means; and a secondary processing unit responsive to said fetching address provided by said main processing unit for executing a set of second instructions independently of said set of first instructions for providing instructions or data to said memory means for accessing by said main processing unit from an actual address in said memory means corresponding to said fetching address, said secondary processing unit being responsive to the detection of said page fault condition by said page fault detecting means for retrieving requested data from a second memory means corresponding to said fetching address and for storing said requested data in said primary memory means for accessing by said main processing unit, said secondary processing unit being operative to suspend said address cycle in response to said page fault condition, and to retrieve said requested data or instructions from said second memory means and store said requested data or instructions in said primary memory means, and then allow completion of said address cycle.

* * * * *